US008580888B2

(12) United States Patent
Tully et al.

(10) Patent No.: US 8,580,888 B2
(45) Date of Patent: Nov. 12, 2013

(54) TWO-PART, CYANOACRYLATE/CATIONICALLY CURABLE ADHESIVE SYSTEMS

(75) Inventors: Raymond P. Tully, Meath (IE); Barry N. Burns, Dublin (IE); Emer Ward, Dublin (IE); Mark Loane, Dublin (IE); Rachel M. Hersee, Dublin (IE)

(73) Assignee: Henkel Ireland Limited, Monheim (DE)

( * ) Notice: Subject to any disclaimer, the term of this patent is extended or adjusted under 35 U.S.C. 154(b) by 0 days.

(21) Appl. No.: 13/593,101

(22) Filed: Aug. 23, 2012

(65) Prior Publication Data
US 2013/0053497 A1 Feb. 28, 2013

Related U.S. Application Data

(63) Continuation of application No. PCT/EP2011/066033, filed on Sep. 15, 2011.

(60) Provisional application No. 61/383,165, filed on Sep. 15, 2010.

(51) Int. Cl.
*C09J 4/00* (2006.01)
*C09D 4/04* (2006.01)
*C08L 31/00* (2006.01)
*C08G 18/48* (2006.01)
*C08K 5/06* (2006.01)

(52) U.S. Cl.
USPC .......... 524/755; 524/710; 524/556; 524/776; 524/773

(58) Field of Classification Search
USPC .......................... 524/710, 755, 776, 773, 556
See application file for complete search history.

(56) References Cited

U.S. PATENT DOCUMENTS

| 4,102,945 A | 7/1978 | Gleave |
| 4,336,367 A | 6/1982 | Morris et al. |
| 4,419,496 A | 12/1983 | Henton et al. |
| 4,440,910 A | 4/1984 | O'Connor |
| 4,444,933 A | 4/1984 | Columbus et al. |
| 4,556,700 A | 12/1985 | Harris et al. |
| 4,622,414 A | 11/1986 | McKervey |
| 4,636,539 A | 1/1987 | Harris et al. |
| 4,695,615 A | 9/1987 | Leonard et al. |
| 4,718,966 A | 1/1988 | Harris et al. |
| 4,778,851 A | 10/1988 | Henton et al. |
| 4,837,260 A | 6/1989 | Sato et al. |
| 4,855,461 A | 8/1989 | Harris et al. |
| 4,906,317 A | 3/1990 | Liu |
| 5,312,864 A | 5/1994 | Wenz et al. |
| 5,382,635 A | 1/1995 | McInnis et al. |
| 5,506,283 A | 4/1996 | McInnis et al. |
| 5,530,037 A | 6/1996 | McDonnell et al. |
| 5,693,714 A | 12/1997 | Bauman et al. |
| 5,969,053 A | 10/1999 | Bauman et al. |
| 5,981,659 A | 11/1999 | Geck et al. |
| 6,111,015 A | 8/2000 | Eldin et al. |
| 6,147,142 A | 11/2000 | Geck et al. |
| 6,180,693 B1 | 1/2001 | Tang et al. |
| 6,429,281 B1 | 8/2002 | Dershem et al. |
| 6,547,985 B1 * | 4/2003 | Tajima et al. ............ 252/182.12 |
| 6,607,632 B1 | 8/2003 | McDonnell et al. |
| 6,617,400 B2 | 9/2003 | Yeager et al. |
| 7,777,064 B2 | 8/2010 | Mizori |
| 2003/0226472 A1 | 12/2003 | Kneafsey |
| 2005/0009242 A1 | 1/2005 | Chang |

FOREIGN PATENT DOCUMENTS

| GB | 2228943 | | 9/1990 |
| GB | 2228943 A | * | 9/1990 |
| JP | 2064183 | | 3/1990 |
| JP | 3227384 | | 10/1991 |
| WO | 2004108825 | | 12/2004 |

OTHER PUBLICATIONS

J.V. Crivello et al., "Photoinduced Cationic Ring-Opening Frontal Polymerizations of Oxetanes and Oxiranes", J. Polym. Sci.: Part A: Polym. Chem., 42, 1630-46 (2004).
International Search Report issued in connection with International Patent Application No. PCT/EP2011/066033 mailed Dec. 23, 2011.

* cited by examiner

*Primary Examiner* — Michael M Bernshteyn
(74) *Attorney, Agent, or Firm* — Steven C. Bauman

(57) ABSTRACT

Two part cyanoacrylate/cationically curable adhesive systems are provided, which contain vinyl ethers.

15 Claims, 4 Drawing Sheets

TWO-PART, CYANOACRYLATE/CATIONICALLY CURABLE ADHESIVE SYSTEMS

BACKGROUND

1. Field

Two part cyanoacrylate/cationically curable adhesive systems are provided, which contain vinyl ethers.

2. Brief Discussion of Related Technology

Curable compositions such as cyanoacrylate adhesives are well recognized for their excellent ability to rapidly bond a wide range of substrates, generally in a number of minutes and depending on the particular substrate, often in a number of seconds.

Polymerization of cyanoacrylates is initiated by nucleophiles found under normal atmospheric conditions on most surfaces. The initiation by surface chemistry means that sufficient initiating species are available when two surfaces are in close contact with a small layer of cyanoacrylate between the two surfaces. Under these conditions a strong bond is obtained in a short period of time. Thus, in essence the cyanoacrylate often functions as an instant adhesive.

Cyanoacrylate adhesive performance, particularly durability, oftentimes becomes suspect when exposed to elevated temperature conditions and/or high relative humidity conditions. To combat these application-dependent shortcomings, a host of additives have been identified for inclusion in cyanoacrylate adhesive formulations. Improvements would still be seen as beneficial.

Cationically curable compositions generally are well known, a chief example among them being epoxy compositions which are widely used. Epoxy compositions once cured are known to form robust bonds between substrates made from many different types of materials. However, epoxy compositions, whether in one part or two parts, do not have anywhere near the same rapid fixture time shown by cyanoacrylates, and may tend to show poor performance properties on substrates constructed from certain materials in particular plastic substrates, such as polycarbonate ("PC"), acrylonitrile-butadiene-styrene copolymer ("ABS"), polymethylmethacrylate ("PMMA"), and polyvinyl chloride ("PVC"), to name a few.

It is also known to use oxetanes (the four membered counterpart to epoxies or oxiranes) in photoinduced cationic cure systems. See J. V. Crivello et al., "Photoinduced Cationic Ring-Opening Frontal Polymerizations of Oxetanes and Oxiranes", *J. Polym. Sci.: Part A: Polym. Chem.*, 42, 1630-46 (2004); U.S. Patent Application Publication No. 2005/0092428.

It would be desirable to provide an adhesive system having both the features of an instant adhesive, such as in terms of the fast fixture times and ability to bond a wide range of substrates such as metals and plastics observed with cyanoacrylates, together with the robust bond strength seen with epoxy compositions.

SUMMARY

There is provided in one aspect a two part curable composition comprising:

(a) a first part comprising a cyanoacrylate component and a cationic catalyst; and (b) a second part comprising a cationically curable component, such as an epoxy component, an episulfide component, an oxetane component, and combinations thereof, and a vinyl ether component, where when mixed together the cationic catalyst initiates cure of the cationically curable component. In addition, the cationically curable component may initiate cure of the cyanoacrylate.

The compositions, which are room temperature curable, provide good performance across substrates constructed from a wide variety of materials and provide improved durability performance over conventional cyanoacrylate compositions and improved fixture time and improved plastics bonding over conventional cationically curable compositions.

DETAILED DESCRIPTION

Part A

Figure 1:
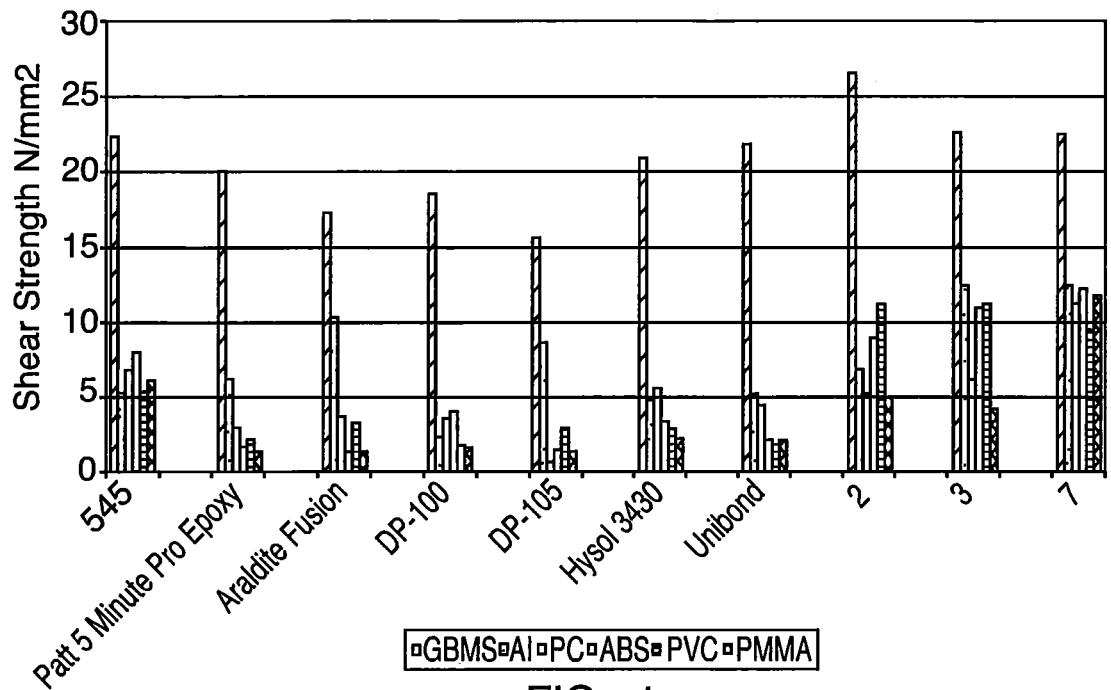
FIG. 1 depicts a bar chart of shear strength of various commercially available products and two part cyanoacrylate/epoxy hybrid adhesive systems.

The cyanoacrylate component includes cyanoacrylate monomers, such as those represented by $H_2C=C(CN)$—COOR, where R is selected from $C_{1-15}$ alkyl, $C_{2-15}$ alkoxyalkyl, $C_{3-15}$ cycloalkyl, $C_{2-15}$ alkenyl, $C_{7-15}$ aralkyl, $C_{6-15}$ aryl, $C_{3-15}$ alkyl and $C_{3-15}$ haloalkyl groups. Desirably, the cyanoacrylate monomer is selected from methyl cyanoacrylate, ethyl-2-cyanoacrylate, propyl cyanoacrylates, butyl cyanoacrylates (such as n-butyl-2-cyanoacrylate), octyl cyanoacrylates, allyl cyanoacrylate, β-methoxyethyl cyanoacrylate and combinations thereof. A particularly desirable one is ethyl-2-cyanoacrylate ("ECA").

The cyanoacrylate component should be included in the Part A composition in an amount within the range of from about 50% to about 99.98% by weight, such as about 75 to about 85% by weight of the total composition being particularly desirable.

As the cationic catalyst to be included in the Part A composition of the two part adhesive system, a hard cation non-nucleophilic anion catalyst should be used. Examples of such catalysts include salts of lithium and metals from Group II of the Periodic Table, and non-nucleophilic acids. Such non-nucleophilic acids have a pH of less than 1.0 when measured as a 10% by weight solution in water and the anion portion of such acids does readily participate in displacement reactions with organic halides. Examples of the Group II metal salts include calcium and magnesium. Examples of non-nucleophilic acids include fluoroboric, fluoroarsenic, fluoroantimonic and fluorophosphoric acids. Accordingly, examples of hard cation non-nucleophilic anion salts include lithium tetrafluoroborate, calcium di-tetrafluoroborate, magnesium di-tetrafluoroborate, lithium hexafluorophosphate, calcium di-hexafluorophosphate, magnesium di-hexafluorophosphate, lithium hexafluoroantimonate and lithium hexafluoroarsenate.

The cationic catalyst may also include lanthanide triflate salts, aryl iodonium salts, aryl sulfonium salts, lanthanum triflate, ytterbium triflate, trimethoxyboroxine, trimethoxyboroxine-aluminum acetyl acetonate, amine-boron trihalide complexes, quaternary ammonium salts, quaternary phosphonium salts, tri-aryl sulfonium salts, di-aryl iodonium salts, and diazonium salts.

Another cationic catalyst suitable for use herein in the Part A composition of the adhesive system are trialkoxyboroxine curing agents, such as are described in U.S. Pat. Nos. 4,336,367 and 6,617,400, the disclosures of each of which are hereby incorporated herein by reference. Of course, combinations of any two or more of these cationic catalysts may be used as well.

Also suitable for use as some or all of the cationic catalyst are boron trifluoride, boron trifluoride-etherate, sulphur trioxide (and hydrolyis products thereof) and methane sulfonic acid, which are oftentimes used to stabilize cyanoacrylate monomers against anionic polymerization (see below), a known issue in shelf life stabilization.

Typically, the amount of cationic catalyst will fall in the range of about 0.001 weight percent up to about 10 weight percent of the composition, desirably about 0.01 weight percent up to about 5 weight percent of the composition, such as about 0.5 to 2.5 weight percent of the composition.

Additives may be included in the Part A composition of the adhesive system to confer physical properties, such as improved fixture speed, improved shelf-life stability, flexibility, thixotropy, increased viscosity, color, and improved toughness. Such additives therefore may be selected from accelerators, free radical stabilizers, anionic stabilizers, gelling agents, thickeners [such as PMMAs], thixotropy conferring agents (such as fumed silica), dyes, toughening agents, plasticizers and combinations thereof.

These additives are discussed in more detail below. However, the accelerators and stabilizers are discussed here.

One or more accelerators may also be used in the adhesive system, particularly, in the Part A composition, to accelerate cure of the cyanoacrylate component. Such accelerators may be selected from calixarenes and oxacalixarenes, silacrowns, crown ethers, cyclodextrins, poly(ethyleneglycol) di(meth)acrylates, ethoxylated hydric compounds and combinations thereof.

Of the calixarenes and oxacalixarenes, many are known, and are reported in the patent literature. See e.g. U.S. Pat. Nos. 4,556,700, 4,622,414, 4,636,539, 4,695,615, 4,718,966, and 4,855,461, the disclosures of each of which are hereby expressly incorporated herein by reference.

For instance, as regards calixarenes, those within the structure below are useful herein:

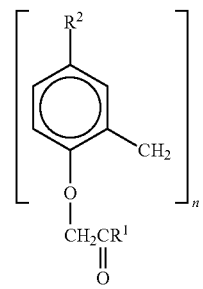

where $R^1$ is alkyl, alkoxy, substituted alkyl or substituted alkoxy; $R^2$ is H or alkyl; and n is 4, 6 or 8.

One particularly desirable calixarene is tetrabutyl tetra[2-ethoxy-2-oxoethoxy]calix-4-arene.

A host of crown ethers are known. For instance, examples which may be used herein either individually or in combination include 15-crown-5,18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4,1,2-decalyl-15-crown-5, 1,2-naphtho-15-crown-5,3,4,5-naphtyl-16-crown-5, 1,2-methyl-benzo-18-crown-6,1,2-methylbenzo-5,6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6 and 1,2-benzo-1,4-benzo-5-oxygen-20-crown-7. See U.S. Pat. No. 4,837,260 (Sato), the disclosure of which is hereby expressly incorporated here by reference.

Of the silacrowns, again many are known, and are reported in the literature. For instance, a typical silacrown may be represented within the structure below:

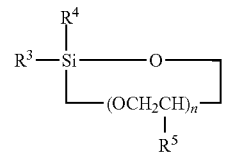

where $R^3$ and $R^4$ are organo groups which do not themselves cause polymerization of the cyanoacrylate monomer, $R^5$ is H or $CH_3$ and n is an integer of between 1 and 4. Examples of suitable $R^3$ and $R^4$ groups are R groups, alkoxy groups, such as methoxy, and aryloxy groups, such as phenoxy. The $R^3$ and $R^4$ groups may contain halogen or other substituents, an example being trifluoropropyl. However, groups not suitable as $R^4$ and $R^5$ groups are basic groups, such as amino, substituted amino and alkylamino.

Specific examples of silacrown compounds useful in the inventive compositions include:

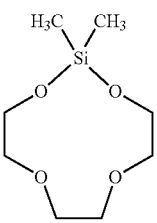

dimethylsila-11-crown-4;

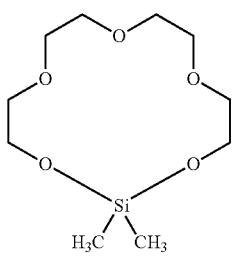 [SMILES: C[Si]1(C)OCCOCCOCCOCCO1]

dimethylsila-14-crown-5;

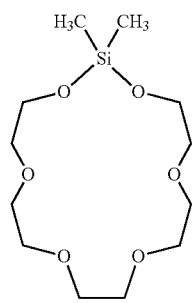 [SMILES: C[Si]1(C)OCCOCCOCCOCCOCCO1]

and dimethylsila-17-crown-6. See e.g. U.S. Pat. No. 4,906,317 (Liu), the disclosure of which is hereby expressly incorporated herein by reference.

Many cyclodextrins may be used in connection with the present invention. For instance, those described and claimed in U.S. Pat. No. 5,312,864 (Wenz), the disclosure of which is hereby expressly incorporated herein by reference, as hydroxyl group derivatives of an α, β or γ-cyclodextrin which is at least partly soluble in the cyanoacrylate would be appropriate choices for use herein as an accelerator component.

In addition, poly(ethylene glycol) di(meth)acrylates suitable for use herein include those within the structure below:

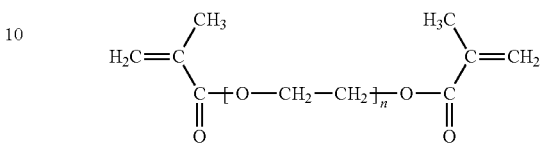

where n is greater than 3, such as within the range of 3 to 12, with n being 9 as particularly desirable. More specific examples include PEG 200 DMA, (where n is about 4) PEG 400 DMA (where n is about 9), PEG 600 DMA (where n is about 14), and PEG 800 DMA (where n is about 19), where the number (e.g., 400) represents the average molecular weight of the glycol portion of the molecule, excluding the two methacrylate groups, expressed as grams/mole (i.e., 400 g/mol). A particularly desirable PEG DMA is PEG 400 DMA.

And of the ethoxylated hydric compounds (or ethoxylated fatty alcohols that may be employed), appropriate ones may be chosen from those within the structure below:

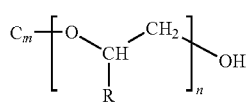

where $C_m$ can be a linear or branched alkyl or alkenyl chain, m is an integer between 1 to 30, such as from 5 to 20, n is an integer between 2 to 30, such as from 5 to 15, and R may be H or alkyl, such as $C_{1-6}$ alkyl.

Commercially available examples of such materials include those offered under the DEHYDOL tradename from Cognis Deutschland GmbH & Co. KGaA, Dusseldorf, Germany, such as DEHYDOL 100.

In addition, accelerators embraced within the structure below:

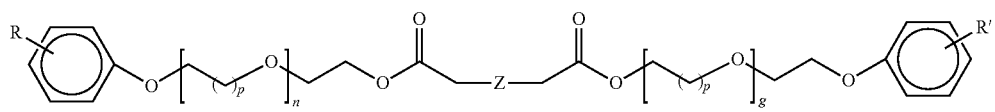

where R is hydrogen, $C_{1-6}$alkyl, $C_{1-6}$alkyloxy, alkyl thioethers, haloalkyl, carboxylic acid and esters thereof, sulfinic, sulfonic and sulfurous acids and esters, phosphinic, phosphonic and phosphorous acids and esters thereof, Z is a polyether linkage, n is 1-12 and p is 1-3 are as defined above, and R' is the same as R, and g is the same as n.

A particularly desirable chemical within this class as an accelerator component is

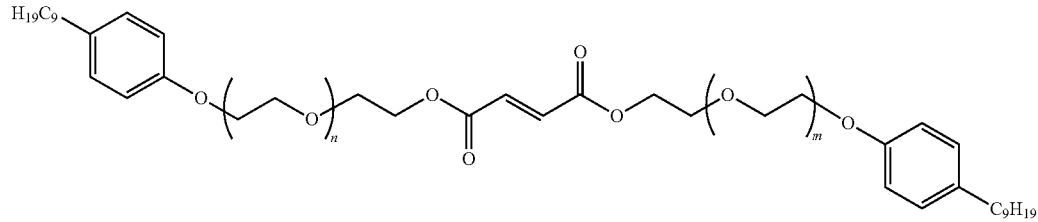

where n and m combined are greater than or equal to 12.

The accelerator should be included in the composition in an amount within the range of from about 0.01% to about 10% by weight, with the range of about 0.1 to about 0.5% by weight being desirable, and about 0.4% by weight of the total composition being particularly desirable.

Stabilizers useful in the Part A composition of the adhesive system include free-radical stabilizers, anionic stabilizers and stabilizer packages that include combinations thereof. The identity and amount of such stabilizers are well known to those of ordinary skill in the art. See e.g. U.S. Pat. Nos. 5,530,037 and 6,607,632, the disclosures of each of which are hereby incorporated herein by reference. Commonly used free-radical stabilizers include hydroquinone, while commonly used anionic stabilizers include boron trifluoride, boron trifluoride-etherate, sulphur trioxide (and hydrolyis products thereof) and methane sulfonic acid. These anionic stabilizers can also serve as the cationic catalyst or a portion thereof, as noted above.

In addition, phosphoric acid may be added to the Part A composition. Phosphoric acid improves performance of the two part composition when used to bond some plastic substrates, particularly those constructed of aluminium.

Part B

Cationically curable monomers for use in the Part B composition of the adhesive system include epoxy monomers, episulfide monomers, oxetane monomers, and combinations thereof.

Epoxy monomers for use in Part B of the composition of the adhesive system include a host of epoxy monomers, with some of the epoxy monomers being aromatic, while others are aliphatic and still others are cycloaliphatic. Examples of such epoxy monomers include bisphenol F diglycidyl ethers (and hydrogenated versions thereof), bisphenol A diglycidyl ethers (and hydrogenated versions thereof), bisphenol S diglycidyl ethers (and hydrogenated versions thereof), bisphenol E diglycidyl ethers (and hydrogenated versions thereof), biphenyl diglycidyl ethers (and hydrogenated versions thereof), 4-vinyl-1-cyclohexene diepoxide, butanediol diglycidyl ether, neopentylglycol diglycidyl ether, 3,4-epoxycyclohexylmethyl-3,4-epoxycyclohexanecarboxylate, limonene diepoxide, α-pinene oxide, hexanediol diglycidyl ether, trimethylolpropane triglycidyl ether, aniline diglycidyl ether, diglycidyl ether of propylene glycol, cyanuric acid triglycidyl ether, ortho-phthalic acid diglycidyl ether, diglycidyl ester of linoleic dimer acid, dicyclopentadiene diepoxide, tetrachlorobisphenol A glycidyl ethers, 1,1,1-tris(p-hydroxyphenyl)ethane glycidyl ether, tetra glycidyl ether of tetrskis(4-hydroxyphenyl)ethane, epoxy phenol novolac resins, epoxy cresol novolac resins, tetraglycidyl-4,4'-diaminodiphenylmethane, and the like.

Among the commercially available epoxy resins suitable for use are polyglycidyl derivatives of phenolic compounds, such as those available under the tradenames EPON 828, EPON 1001, EPON 1009, and EPON 1031, from Shell Chemical Co.; DER 331, DER 332, DER 334, and DER 542 from Dow Chemical Co.; GY285 from Ciba Specialty Chemicals, Tarrytown, N.Y.; and BREN-S from Nippon Kayaku, Japan; epoxidized polybutadienes, such as POLYBD from Sartomer, EPOLEAD PB 3600 from Daicel, JP-100 and JP-200 from Nippon Soda, epoxidised liquid isoprene rubbers such as KL-610, KL-613 and KL-630T from Kuraray; and epoxidised liquid polyisoprenes such as EPOXYPRENE 25 and EPOXYPRENE 50 from Sanyo Corporation. Other suitable epoxy resins include polyepoxides prepared from polyols and the like and polyglycidyl derivatives of phenol-formaldehyde novolacs, the latter of which are available commercially under the tradenames DEN 431, DEN 438, and DEN 439 from Dow Chemical Company. Cresol analogs are also available commercially ECN 1235, ECN 1273, and ECN 1299 from Ciba Specialty Chemicals. SU-8 is a bisphenol A-type epoxy novolac available from Resolution. Of course, cycloaliphatic epoxy resins, such as those available under the CYRACURE tradename, and hydrogenated bisphenol and biphenyl type epoxy resins, as noted, such as those available under the EPALLOY tradename, are suitable for use herein.

Cycloaliphatic epoxy resins contain at least one cycloaliphatic group and at least one oxirane group, oftentimes two oxirane groups. Representative cycloaliphatic epoxy resins include 2-(3,4-epoxy)cyclohexyl-5,5-spiro-(3,4-epoxy)cyclohexane-m-dioxane, 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, vinyl cyclohexanedioxide, bis(3,4-epoxycyclohexylmethyl)adipate, bis(3,4-epoxy-6-methylcyclohexylmethyl)adipate, exo-exo bis(2,3-epoxycyclopentyl)ether, endo-exo bis(2,3-epoxycyclopentyl)ether, 2,2-bis(4-(2,3-epoxypropoxy)cyclohexyl)propane, 2,6-bis(2,3-epoxypropoxycyclohexyl-p-dioxane), 2,6-bis(2,3-epoxypropoxy)norbornene, the diglycidylether of linoleic acid dimer, limonene dioxide, 3-vinylcyclohexene oxide, 3-vinylcyclohexene dioxide, epoxidised poly(1,3-butadiene-acrylonitrile), epoxidised soybean oil, epoxidised castor oil, epoxidised linseed oil, 2,2-bis(3,4-epoxycyclohexyl)propane, dicyclopentadiene dioxide, tricyclopentadiene dioxide, tetracyclopentadiene dioxide, 1,2-epoxy-6-(2,3-epoxypropoxy)hexahydro-4,7-methanoindane, p-(2,3-epoxy)cyclopentylphenyl-2,3-epoxypropylether, 1-(2,3-epoxypropoxy)phenyl-5,6-epoxyhexahydro-4,7-methanoindane, o-(2,3-epoxy)cyclopentylphenyl-2,3-epoxypropyl ether), 1,2-bis[5-

(1,2-epoxy)-4,7-hexahydromethanoindanoxyl]ethane, cyclopentenylphenyl glycidyl ether, cyclohexanediol diglycidyl ether, and diglycidyl hexahydrophthalate. Siloxane functional epoxy resins may also be utilised such as 1,3-bis (3,4-epoxycyclohexyl-2-ethyl)-1,1,3,3-tetramethyldisiloxane and other epoxy functional linear/cyclic siloxanes such as those disclosed in U.S. Pat. No. 7,777,064, the disclosure of which being hereby expressly incorporated herein by reference. In particular embodiments cycloaliphatic epoxy resins are 3,4-epoxycyclohexylmethyl-3,4-epoxycyclohexanecarboxylate and 3,4-epox-6-methylcyclohexylmethyl-3,4-epoxy-6-methylcyclohexanecarboxylate. Other examples of cycloaliphatic epoxies suitable for use herein include those disclosed and described in U.S. Pat. No. 6,429,281 (Dershem), the disclosure of which being hereby expressly incorporated herein by reference.

And of course combinations of the epoxy resins are also desirable for use herein.

The episulfide monomer may simply be the full or partial sulphur-containing three-membered ring version of the base epoxy monomer.

The oxetane monomers may be chosen from

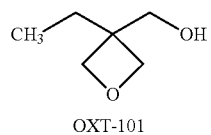

OXT-101

A

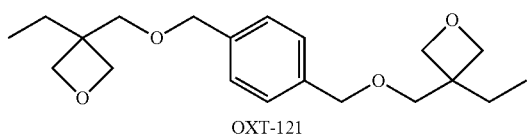

OXT-121

B

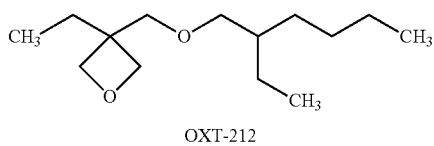

OXT-212

C

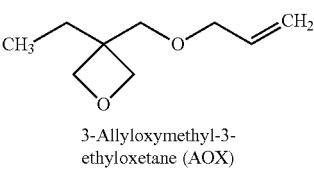

3-Allyloxymethyl-3-ethyloxetane (AOX)

D

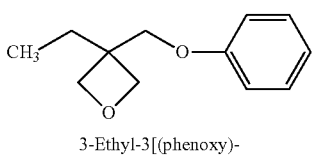

3-Ethyl-3[(phenoxy)-methyl]oxetane (POX)

E

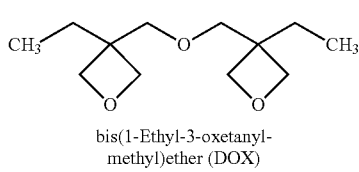

bis(1-Ethyl-3-oxetanyl-methyl)ether (DOX)

F

Oxetanes labeled A-C are available from Toa Gosei Co., Ltd., Japan.

The epoxy, episulfide and/or oxetane monomer may be one that is functionalized with one or more alkoxy silane groups. Examples of such materials include those commercially available from Gelest Inc., Morrisville, Pa.

The cationically curable component should be included in the Part B composition in an amount within the range of from about 50% to about 99.98% by weight, such as about 90% to about 99% by weight being desirable, and about 92% to about 97% by weight of the total composition being particularly.

The vinyl ether component included in the Part B composition may be any vinyl ether, though particularly desirable ones include bis[4-(vinyloxy)butyl] isophthalate (available commercially under the tradename VECTOMER, such at VECTOMER 4010, the chemical structure of which is shown below) and 1,4-cyclohexanedimethanol divinyl ether.

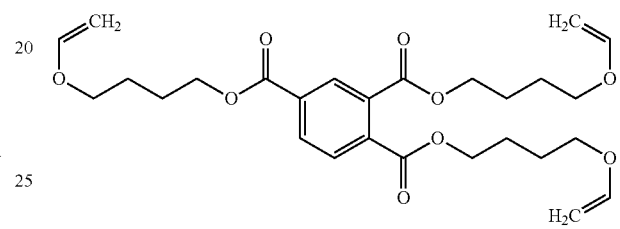

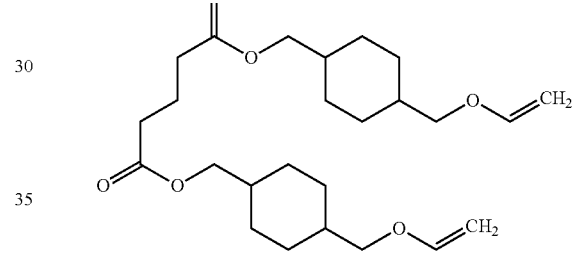

VECTOMER 5015 and VECTOMER 4020 may be used as well. Their chemical structures are shown below:

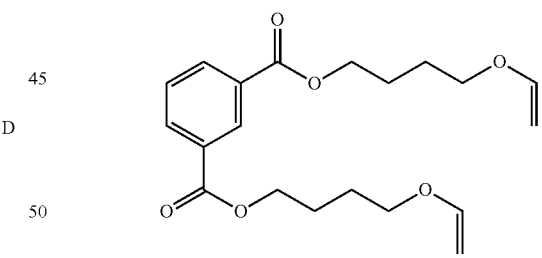

Additional vinyl ethers that may be used herein and are commercially available from BASF Corporation include Ethyl vinyl ether, n-Butyl vinyl ether, Iso-Butyl vinyl ether, t-Butyl vinyl ether, Cyclohexyl vinyl ether, 1,4-Cyclohexanedimethanol divinyl ether, 1,4-Cyclohexanedimethanol mono vinyl ether, 2-Ethylhexyl vinyl ether, Dodecyl vinyl ether, Octadecyl vinyl ether, 1,4-Butanediol divinyl ether, Diethyleneglycol divinyl ether, Triethyleneglycol divinyl ether and Hydroxybutyl vinyl ether.

The vinyl ether component should be included in the Part B composition in an amount within the range of from about 0.1 to about 10%, such as to about 0.25 to about 5% by weight.

As discussed above, additives may be included in either or both of the Part A or the Part B compositions to influence a variety of performance properties.

Fillers contemplated for optional use include, for example, aluminum nitride, boron nitride, silicon carbide, diamond, graphite, beryllium oxide, magnesia, silicas, such as fumed silica or fused silica, alumina, perfluorinated hydrocarbon polymers (i.e., TEFLON), thermoplastic polymers, thermoplastic elastomers, mica, glass powder and the like. Preferably, the particle size of these fillers will be about 20 microns or less.

As regards silicas, the silica may have a mean particle diameter on the nanoparticle size; that is, having a mean particle diameter on the order of $10^{-9}$ meters. The silica nanoparticles can be pre-dispersed in epoxy resins, and may be selected from those available under the tradename NANOPOX, from Nanoresins, Germany. NANOPOX is a tradename for a product family of silica nanoparticle reinforced epoxy resins showing an outstanding combination of material properties. The silica phase consists of surface-modified, synthetic $SiO_2$ nanospheres with less than 50 nm diameter and an extremely narrow particle size distribution. The $SiO_2$ nanospheres are agglomerate-free dispersions in the epoxy resin matrix resulting in a low viscosity for resins containing up to 50 wt % silica.

A commercially available example of the NANOPOX products particularly desirable for use herein includes NANOPOX A610 (a 40 percent by weight dispersion in a cycloaliphatic epoxy resin matrix). The NANOPOX products are believed to have a particle size of about 5 nm to about 80 nm, though the manufacturer reports less than 50 nm.

The silica component should be present in an amount in the range of about 1% to about 60% by weight, such as about 3% to about 30% by weight, desirably about 5% to about 20% by weight, based on the total weight of the composition.

In addition, Nanoresins offers commercially products under the tradenames ALBIDUR (epoxy resins containing core shell silicone rubber particles; such as EP 2240, EP2240A, EP 5340); ALBIFLEX (epoxy-siloxane block copolymer resins); and ALBIPOX (epoxy resins containing epoxy-nitrile butadiene rubber adducts).

Flexibilizers (also called plasticizers) contemplated for use include branched polyalkanes or polysiloxanes that can lower the $T_g$ of the composition. Such flexibilizers include, for example, polyethers, polyesters, polythiols, polysulfides, and the like. If used, flexibilizers typically are present in the range of about 0.5 weight percent up to about 50 weight percent of the composition, with about 25 to about 35 weight percent of the composition being more desirable.

The flexibilizers may also be reactive; that is, they may be functionalized so as to react into the cured reaction product. In such cases, hydroxyl-functionalized resins can be used, as they tend to co-react with cationically curable components, such as epoxy resins, and thus used can modify the mechanical properties of the cured products.

For instance, hydroxy-functionalized aliphatic polyester diols provide improved flexibility to the cured composition. One commercially available example of the diol is K-FLEX A307, which is from King Industries. K-FLEX A307 is reported by the manufacturer to be a low viscosity, 100% solids linear, saturated, aliphatic polyester diol with primary hydroxyl groups. K-FLEX A307 is promoted to have been designed as a flexibility modifier for acrylic/isocyanates and acrylic/melamine systems. Commercial applications are advertised as automotive OEM, automotive refinish, aerospace, industrial maintenance, and plastic coatings.

Others include PolyTHF 650/1400/2000/2900 (sold under the trade name TERATHANE), polycaprolactone diols and triols (Aldrich), polydimethylsiloxane-polycaprolactone diols (such as WAX 350 OH D from Wacker), K-PURE CDR-3441, CDR-3319 (King Industry) and primary or secondary hydroxyl terminated polybutadienes/hydrogenated polybutadienes (Cray Valley, such as POLYBD/KRASOL materials).

Tougheners contemplated for use particularly in the Part A composition include elastomeric polymers selected from elastomeric copolymers of a lower alkene monomer and (i) acrylic acid esters, (ii) methacrylic acid esters or (iii) vinyl acetate, such as acrylic rubbers; polyester urethanes; ethylene-vinyl acetates; fluorinated rubbers; isoprene-acrylonitrile polymers; chlorosulfinated polyethylenes; and homopolymers of polyvinyl acetate were found to be particularly useful. [See U.S. Pat. No. 4,440,910 (O'Connor), the disclosures of each of which are hereby expressly incorporated herein by reference.] The elastomeric polymers are described in the '910 patent as either homopolymers of alkyl esters of acrylic acid; copolymers of another polymerizable monomer, such as lower alkenes, with an alkyl or alkoxy ester of acrylic acid; and copolymers of alkyl or alkoxy esters of acrylic acid. Other unsaturated monomers which may be copolymerized with the alkyl and alkoxy esters of acrylic include dienes, reactive halogen-containing unsaturated compounds and other acrylic monomers such as acrylamides.

For instance, one group of such elastomeric polymers are copolymers of methyl acrylate and ethylene, manufactured by DuPont, under the name of VAMAC, such as VAMAC N123 and VAMAC B-124. VAMAC N123 and VAMAC B-124 are reported by DuPont to be a master batch of ethylene/acrylic elastomer. The DuPont material VAMAC G is a similar copolymer, but contains no fillers to provide color or stabilizers. VAMAC VCS rubber appears to be the base rubber, from which the remaining members of the VAMAC product line are compounded. VAMAC VCS (also known as VAMAC MR) is a reaction product of the combination of ethylene, methyl acrylate and monomers having carboxylic acid cure sites, which once formed is then substantially free of processing aids such as the release agents octadecyl amine, complex organic phosphate esters and/or stearic acid, and anti-oxidants, such as substituted diphenyl amine.

Recently, DuPont has provided to the market under the trade designation VAMAC VMX 1012 and VCD 6200, which are rubbers made from ethylene and methyl acrylate. It is believed that the VAMAC VMX 1012 rubber possesses little to no carboxylic acid in the polymer backbone. Like the VAMAC VCS rubber, the VAMAC VMX 1012 and VCD 6200 rubbers are substantially free of processing aids such as the release agents octadecyl amine, complex organic phosphate esters and/or stearic acid, and anti-oxidants, such as substituted diphenyl amine, noted above. All of these VAMAC elastomeric polymers are useful herein.

In addition, vinylidene chloride-acrylonitrile copolymers [see U.S. Pat. No. 4,102,945 (Cleave)] and vinyl chloride/vinyl acetate copolymers [see U.S. Pat. No. 4,444,933 (Columbus)] may be included in the Part A composition. Of course, the disclosures of each these U.S. patents are hereby incorporated herein by reference in their entirety.

Copolymers of polyethylene and polyvinyl acetate, available commercially under the trade name LEVAMELT by LANXESS Limited, are useful.

A range of LEVAMELT agents is available and includes for example, LEVAMELT 400, LEVAMELT 600 and LEVAMELT 900. The LEVAMELT products differ in the amount of vinyl acetate present. For example, LEVAMELT 400 comprises an ethylene-vinyl acetate copolymer comprising 40 wt % vinyl acetate. The LEVAMELT products are supplied in granular form. The granules are almost colourless and dusted with silica and talc. LEVAMELT consists of methylene units forming a saturated main chain with pendant acetate groups. The presence of a fully saturated main chain is an indication that LEVAMELT is a particularly stable polymer. It does not contain any reactive double bonds which make conventional rubbers prone to aging reactions, ozone and UV light. The saturated backbone makes it robust.

Interestingly, depending on the ratio of polyethylene/polyvinylacetate, the solubilities of these LEVAMELT elastomers change in different monomers and also the ability to toughen changes as a result of the solubility.

The LEVAMELT elastomers are available in pellet form and are easier to formulate than other known elastomeric toughening agents.

VINNOL brand surface coating resins available commercially from Wacker Chemie AG, Munich, Germany represent a broad range of vinyl chloride-derived copolymers and terpolymers that are promoted for use in different industrial applications. The main constituents of these polymers are different compositions of vinyl chloride and vinyl acetate. The terpolymers of the VINNOL product line additionally contain carboxyl or hydroxyl groups. These vinyl chloride/vinyl acetate copolymers and terpolymers may also be used.

VINNOL surface coating resins with carboxyl groups are terpolymers of vinyl chloride, vinyl acetate and dicarboxylic acids, varying in terms of their molar composition and degree and process of polymerization. These terpolymers are reported to show excellent adhesion, particularly on metallic substrates.

VINNOL surface coating resins with hydroxyl groups are copolymers and terpolymers of vinyl chloride, hydroxyacrylate and dicarboxylate, varying in terms of their composition and degree of polymerization.

VINNOL surface coating resins without functional groups are copolymers of vinyl chloride and vinyl acetate of variable molar composition and degree of polymerization.

Rubber particles, especially rubber particles that have relatively small average particle size (e.g., less than about 500 nm or less than about 200 nm), may also be included, particularly in the Part B composition. The rubber particles may or may not have a shell common to known core-shell structures.

In the case of rubber particles having a core-shell structure, such particles generally have a core comprised of a polymeric material having elastomeric or rubbery properties (i.e., a glass transition temperature less than about 0° C., e.g., less than about −30° C.) surrounded by a shell comprised of a non-elastomeric polymeric material (i.e., a thermoplastic or thermoset/crosslinked polymer having a glass transition temperature greater than ambient temperatures, e.g., greater than about 50° C.). For example, the core may be comprised of a diene homopolymer or copolymer (for example, a homopolymer of butadiene or isoprene, a copolymer of butadiene or isoprene with one or more ethylenically unsaturated monomers such as vinyl aromatic monomers, (meth)acrylonitrile, (meth)acrylates, or the like) while the shell may be comprised of a polymer or copolymer of one or more monomers such as (meth)acrylates (e.g., methyl methacrylate), vinyl aromatic monomers (e.g., styrene), vinyl cyanides (e.g., acrylonitrile), unsaturated acids and anhydrides (e.g., acrylic acid), (meth)acrylamides, and the like having a suitably high glass transition temperature. Other rubbery polymers may also be suitably be used for the core, including polybutylacrylate or polysiloxane elastomer (e.g., polydimethylsiloxane, particularly crosslinked polydimethylsiloxane).

The rubber particle may be comprised of more than two layers (e.g., a central core of one rubbery material may be surrounded by a second core of a different rubbery material or the rubbery core may be surrounded by two shells of different composition or the rubber particle may have the structure soft core, hard shell, soft shell, hard shell). In one embodiment of the invention, the rubber particles used are comprised of a core and at least two concentric shells having different chemical compositions and/or properties. Either the core or the shell or both the core and the shell may be crosslinked (e.g., ionically or covalently). The shell may be grafted onto the core. The polymer comprising the shell may bear one or more different types of functional groups (e.g., epoxy groups) that are capable of interacting with other components of the compositions of the present invention.

Typically, the core will comprise from about 50 to about 95 weight percent of the rubber particles while the shell will comprise from about 5 to about 50 weight percent of the rubber particles.

Preferably, the rubber particles are relatively small in size. For example, the average particle size may be from about 0.03 to about 2 microns or from about 0.05 to about 1 micron. The rubber particles may have an average diameter of less than about 500 nm, such as less than about 200 nm. For example, the core-shell rubber particles may have an average diameter within the range of from about 25 to about 200 nm.

Methods of preparing rubber particles having a core-shell structure are well-known in the art and are described, for example, in U.S. Pat. Nos. 4,419,496, 4,778,851, 5,981,659, 6,111,015, 6,147,142 and 6,180,693, each of which being incorporated herein by reference in its entirety.

Rubber particles having a core-shell structure may be prepared as a masterbatch where the rubber particles are dispersed in one or more epoxy resins such as a diglycidyl ether of bisphenol A. For example, the rubber particles typically are prepared as aqueous dispersions or emulsions. Such dispersions or emulsions may be combined with the desired epoxy resin or mixture of epoxy resins and the water and other volatile substances removed by distillation or the like. One method of preparing such masterbatches is described in more detail in International Patent Publication No. WO 2004/108825, the disclosure of which being expressly incorporated herein by reference in its entirety. For example, an aqueous latex of rubber particles may be brought into contact with an organic medium having partial solubility in water and then with another organic medium having lower partial solubility in water than the first organic medium to separate the water and to provide a dispersion of the rubber particles in the second organic medium. This dispersion may then be mixed with the desired epoxy resin(s) and volatile substances removed by distillation or the like to provide the masterbatch.

Particularly suitable dispersions of rubber particles having a core-shell structure in an epoxy resin matrix are available from Kaneka Corporation.

For instance, the core may be formed predominantly from feed stocks of polybutadiene, polyacrylate, polybutadiene/acrylonitrile mixture, polyols and/or polysiloxanes or any other monomers that give a low glass transition temperature. The outer shells may be formed predominantly from feed stocks of polymethylmethacrylate, polystyrene or polyvinyl chloride or any other monomers that give a higher glass transition temperature.

The core shell rubbers may have a particle size in the range of 0.07 to 10 um, such as 0.1 to 5 um.

The core shell rubber made in this way may be dispersed in a thermosetting resin matrix, such as an epoxy matrix or a phenolic matrix. Examples of epoxy matrices include the diglycidyl ethers of bisphenol A, F or S, or biphenol, novalac epoxies, and cycloaliphatic epoxies. Examples of phenolic resins include bisphenol-A based phenoxies. The matrix material ordinarily is liquid at room temperature.

The core shell rubber dispersion may be present in an amount in the range of about 5 to about 50% by weight, with about 15 to about 25% by weight being desirable based on viscosity considerations.

When used, these core shell rubbers allow for toughening to occur in the composition and oftentimes in a predictable manner—in terms of temperature neutrality toward cure—because of the substantial uniform dispersion, which is ordinarily observed in the core shell rubbers as they are offered for sale commercially.

Many of the core-shell rubber structures available from Kaneka, such as those available under the KaneAce tradename, are believed to have a core made from a copolymer of (meth)acrylate-butadiene-styrene, where the butadiene is the primary component in the phase separated particles, dispersed in epoxy resins. Other commercially available masterbatches of core-shell rubber particles dispersed in epoxy resins include GENIOPERL M23A (a dispersion of 30 weight percent core-shell particles in an aromatic epoxy resin based on bisphenol A diglycidyl ether; the core-shell particles have an average diameter of ca. 100 nm and contain a crosslinked silicone elastomer core onto which an epoxy-functional acrylate copolymer has been grafted); the silicone elastomer core represents about 65 weight percent of the core-shell particle), available from Wacker Chemie GmbH.

In the case of those rubber particles that do not have such a shell, the rubber particles may be based on the core of such structures.

Preferably, the rubber particles are relatively small in size. For example, the average particle size may be from about 0.03 to about 2µ or from about 0.05 to about 1µ. In certain embodiments of the invention, the rubber particles have an average diameter of less than about 500 nm. In other embodiments, the average particle size is less than about 200 nm. For example, the rubber particles may have an average diameter within the range of from about 25 to about 200 nm or from about 50 to about 150 nm.

The rubber particles generally are comprised of a polymeric material having elastomeric or rubbery properties (i.e., a glass transition temperature less than about 0° C., e.g., less than about −30° C.). For example, the rubber particles may be comprised of a diene homopolymer or copolymer (for example, a homopolymer of butadiene or isoprene, a copolymer of butadiene or isoprene with one or more ethylenically unsaturated monomers such as vinyl aromatic monomers, (meth)acrylonitrile, (meth)acrylates, or the like) and polysiloxanes. The rubber particles may contain functional groups such as carboxylate groups, hydroxyl groups or the like and may have a linear, branched, crosslinked, random copolymer or block copolymer structure.

For instance, the rubber particles may be formed predominantly from feed stocks of dienes such as butadiene, (meth) acrylates, ethylenically unsaturated nitriles such as acrylonitrile, and/or any other monomers that when polymerized or copolymerized yield a polymer or copolymer having a low glass transition temperature.

The rubber particles may be used in a dry form or may be dispersed in a matrix, as noted above.

Typically, the composition may contain from about 5 to about 35 weight percent (in one embodiment, from about 15 to about 30 weight percent) rubber particles.

Combinations of different rubber particles may advantageously be used in the present invention. The rubber particles may differ, for example, in particle size, the glass transition temperatures of their respective materials, whether, to what extent and by what the materials are functionalized, and whether and how their surfaces are treated.

A portion of the rubber particles may be supplied in the form of a masterbatch where the particles are stably dispersed in an epoxy resin matrix and another portion may be supplied to the adhesive composition in the form of a dry powder (i.e., without any epoxy resin or other matrix material). For example, the adhesive composition may be prepared using both a first type of rubber particles in dry powder form having an average particle diameter of from about 0.1 to about 0.5 p and a second type of rubber particles stably dispersed in a matrix of liquid bisphenol A diglycidyl ether at a concentration of from about 5 to about 50 percent by weight having an average particle diameter of from about 25 to about 200 nm. The weight ratio of first type:second type rubber particles may be from about 1.5:1 to about 0.3:1, for example.

The chemical composition of the rubber particles may be essentially uniform throughout each particle. However, the outer surface of the particle may be modified by reaction with a coupling agent, oxidizing agent or the like so as to enhance the ability to disperse the rubber particles in the adhesive composition (e.g., reduce agglomeration of the rubber particles, reduce the tendency of the rubber particles to settle out of the adhesive composition). Modification of the rubber particle surface may also enhance the adhesion of the epoxy resin matrix to the rubber particles when the adhesive is cured. The rubber particles may alternatively be irradiated so as to change the extent of crosslinking of the polymer(s) constituting the rubber particles in different regions of the particle. For example, the rubber particles may be treated with gamma radiation such that the rubber is more highly crosslinked near the surface of the particle than in the center of the particle.

Rubber particles that are suitable for use in the present invention are available from commercial sources. For example, rubber particles supplied under the PARALOID tradename, such as PARALOID 2314, PARALOID 2300, and PARALOID 2600, from Dow Chemical Co., Philadelphia, Pa., and those available under the STAPHYLOID tradename, such as STAPHYLOID AC-3832, from Ganz Chemical Co., Ltd., Osaka, Japan, may be used.

Rubber particles that have been treated with a reactive gas or other reagent to modify the outer surfaces of the particles by, for instance, creating polar groups (e.g., hydroxyl groups, carboxylic acid groups) on the particle surface, are also suitable for use in the present invention. Illustrative reactive gases include, for example, ozone, $Cl_2$, $F_2$, $O_2$, $SO_3$, and oxidative gases. Methods of surface modifying rubber particles using such reagents are known in the art and are described, for example, in U.S. Pat. Nos. 5,382,635; 5,506,283; 5,693,714; and 5,969,053, each of which is incorporated herein by reference in its entirety. Suitable surface modified rubber particles are also available from commercial sources, such as the rubbers sold under the tradename VISTAMER by Exousia Corporation.

Where the rubber particles are initially provided in dry form, it may be advantageous to ensure that such particles are well dispersed in the adhesive composition prior to curing the adhesive composition. That is, agglomerates of the rubber particles are preferably broken up so as to provide discrete individual rubber particles, which may be accomplished by intimate and thorough mixing of the dry rubber particles with other components of the adhesive composition. For example, dry rubber particles may be blended with epoxy resin and milled or melt compounded for a length of time effective to essentially completely disperse the rubber particles and break up any agglomerations of the rubber particles.

Thickeners are also useful.

In practice, each of the Part A and the Part B compositions are housed in separate containment vessels in a device prior to use, where in use the two parts are expressed from the vessels mixed and applied onto a substrate surface. The vessels may be chambers of a dual chambered cartridge, where the separate parts are advanced through the chambers with plungers through an orifice (which may be a common one or adjacent ones) and then through a mixing dispense nozzle. Or the vessels may be coaxial or side-by-side pouches, which may be cut or torn and the contents thereof mixed and applied onto a substrate surface.

The invention will be more readily appreciated by a review of the examples, which follow.

EXAMPLES

Reference to CA or cyanoacrylate in the Examples refers to ethyl-2-cyanoacrylate, unless otherwise noted.

With reference to Table 1, four different types of adhesive systems are set forth, two being one part and two being two part systems, with a listing of general constituents of each provided. As for the two part, cyanoacrylate epoxy hybrid adhesive system, two versions were prepared: one where boron trifluoride-etherate—an anionic stabilizer in LOCTITE 401—served as the cationic catalyst and a second where lithium tetrafluoroborate served as the cationic catalyst. These versions will be referred to as I and II in Table 2.

Table 2 illustrates desirable physical properties (such as in terms of lap shear strength) across a variety of substrates for the two part cyanoacrylate epoxy hybrid adhesive system embodiment of the two-part, cyanoacrylate/cationic curable adhesive system, as compared with the other adhesive systems identified. The one part epoxy adhesive system is based on a latent epoxy curative and as such requires the application of heat in order for cure to take place. Such one part epoxy adhesives do not cure at room temperature. The cyanoacrylate and the two part epoxy adhesive systems are well known to undergo cure at room temperature.

Cyanoacrylates are well known for their ability to bond quickly at room temperature to a wide range of substrates, such as metals and plastics. The two part epoxy products also bond metals very well at room temperature, but their ability to bond plastic substrates does not match that of cyanoacrylates. Two part epoxy adhesives on the other hand are known for their excellent durability on metal substrates when subjected to harsh environmental conditions such as high temperature, or high temperature plus high humidity. Under such conditions cyanoacrylates do not perform very well, particularly when compared to two part epoxy products. As shown in the Examples, the two part cyanoacrylate epoxy hybrid adhesive system embodiment of the two-part, cyanoacrylate/cationic curable adhesive system cures at room temperature on a range of metal or plastic substrates, yet exhibits extreme durability under harsh environmental conditions.

TABLE 1

| CA | 1K Epoxy[++] | 2K Epoxy[+++] | | 2K CA-Epoxy Hybrid | |
|---|---|---|---|---|---|
| | | Part A | Part B | Part A | Part B |
| LOCTITE 401[+] | DER 331 | DER 331 | Mercaptan | LOCTITE 401 | Cycloaliphatic Epoxy |
| | CARDURA E10 | — | — | Cationic Catalyst | — |
| | AEROSIL R202 | — | — | — | — |
| | AJICURE PN 23 | — | — | — | — |

[+]LOCTITE 401, 60-100% ECA, 5-10% thickener, as reported on a material safety data sheet ("MSDS") for the product
[++]Based on LOCTITE 3621, 10-30% phenyl polymer with formaldehyde, glydyl ether, 10-30% epichlorohydrin-4,4'-isopropylidene diphenol resin, 10-30% amine adduct, 10-30% 2,3-epoxypropyl neodecanoate, 5-10% treated fumed silica, as reported on a MSDS for the product
[+++]PATTEX 5 Minute Pro Epoxy, a bisphenol-A-epichlorohydrin epoxy resin-containing two part epoxy, as reported on a package for the product With reference to Table 2, each of the four adhesive systems set forth in Table 1 was applied to the noted substrate (where *SF=substrate failure) which was mated in an overlapped, off-set manner with the adhesive system disposed between the substrates in the overlapped, off-set portion, and allowed to cure for 24 hours at room temperature. The lap shear strength was observed and recorded.

TABLE 2

| Adhesive System | Lap Shear Strength on Noted Substrate/24 Hours @ RT [Nmm²] | | | | | |
|---|---|---|---|---|---|---|
| | GBMS | Al | PVC | PMMA | ABS | PC |
| CA | 18.19 | 7.20 | 5.33 | 6.75 | 9.20 | 9.14 |
| 1K Epoxy | No Cure | No Cure | No Cure | No Cure | No Cure | No Cure |
| 2K Epoxy | 20.06 | 9.72 | 1.62 | 0.70 | 1.37 | 2.76 |
| 2K CA-Epoxy Hybrid I | 14.69 | 16.10 | 6.73 | 8.76 | 10.06 | 5.9 |
| 2K CA-Epoxy Hybrid II | 22.5 | 9.4 | 9.5 SF* | 11.8 SF* | 12.2 SF* | 11.2 |

With reference to Table 3, three of the four adhesive systems set forth in Table 1 were applied to the noted metal substrates which were mated in an overlapping, off-set manner and cured at room temperature. (The fourth—a one part epoxy—is known not to cure at room temperature, and thus was not subjected to durability testing here.) The cured assemblies were then exposed to the noted conditions. The lap shear strength was observed and recorded for each.

TABLE 3

| | Durablity Testing | | |
|---|---|---|---|
| | | Conditions | |
| Adhesive System | Substrate | 1 Week @ 150° C. | 1 Week @ 65° C./95% RH |
| CA | GBMS | 0 | 8.43 |
| | Al | 0 | 0 |
| 2K Epoxy | GBMS | 30.0 | 5.65 |
| | Al | 4.05 | 0.92 |
| 2K CA-Epoxy Hybrid | GBMS | 17.46 | 21.21 |
| | Al | 9.31 | 2.6 |

Table 3 illustrates desirable physical properties (such as in terms of durability testing, particularly under modest temperature elevation and high humidity conditions) across two metal substrates for the two part cyanoacrylate epoxy hybrid embodiment of the two-part, cyanoacrylate/cationic curable adhesive system, as compared with the other adhesive systems identified, particularly the cyanoacrylates. Cyanoacrylates are known to have poor thermal and humidity durability and two part epoxy adhesives have been observed to show poor performance under humid aging conditions, though system over a two part epoxy in that it offers adhesion to a broader range of substrates, in particular plastic ones. Table 4 also demonstrates that the two part cyanoacrylate epoxy hybrid embodiment of the two-part, cyanoacrylate/cationic curable adhesive system has similar adhesion to a cyanoacrylate on the various substrates, but as shown the two part cyanoacrylate epoxy hybrid embodiment of the two-part, cyanoacrylate/cationic curable adhesive system has superior durability compared to a cyanoacrylate.

TABLE 4

| Adhesive System | | Cure Schedule (hrs) @ | Lap Shear Strength on Noted Substrate [Nmm$^2$] | | | | | |
|---|---|---|---|---|---|---|---|---|
| Type | Name | RT | GBMS | Al | PVC | ABS | PC | PMMA |
| CA | LOCTITE 454+ | 24 | 20.68 | 3.75 | 7.87 | 8.04 | 7.85 | — |
| 2K Epoxy | ARALDITE FUSION Power Adhesive++ | 72 | 17.28 | 10.39 | 3.35 | 1.34 | 3.69 | — |
| | ARALDITE 2011+++ | 72 | 21.78 | 18.23 | 5.12 | 0.77 | 9.64 | — |
| | PATTEX 5 Minute Pro Epoxy^ | 72 | 20.06 | 6.23 | 2.16 | 1.66 | 2.97 | 0.71 |
| | HYSOL 3430* | 168 | 24.52 | 18.09 | 4.85 | 3.33 | 4.32 | — |
| | DP-100** | 168 | 21.65 | 6.96 | 1.85 | 4.03 | 3.58 | — |
| | DP-105*** | 168 | 22.03 | 9.18 | 2.97 | 1.46 | 0.62 | — |
| 2K CA Epoxy Hybrid | Sample No. 2 | 72 | 20.40 | 9.03 | 8.41 | 6.60 | 6.17 | 4.93 |

+As reported on a MSDS, ECA, 60-100%, treated fumed silica, 5-10%

++As reported on the product package card, bisphenol A-epichlorohydrin epoxy resin; bisphenol F epoxy resin; blend of polymercaptans; and alkylaminophenol, amino ethers.

+++As reported on the MSDS of the manufacturer,

^As reported on the on the product package card, bisphenol A-epichlorohydrin epoxy resin

*As reported on a MSDS from the manufacturer, bisphenol A epoxide resin, 30-40%, phenol polymer with formaldehyde glycidyl ether, 30-40%, bisphenol A diglycidyl ether polymer, 20-40% in Part A and 2,2'-[1,2-ethanediylbis(oxy)] bis(ethanethiol), 10-20%, N,N-dimethyldipropyltriamine, 1-10%, 4,7,10-trioxa-1,13-tridecanamine, 1-5% in Part B

**As reported on the MSDS from the manufacturer, 3M, epoxy resin, 100% in Part A and mercaptan polymer, 80-95%, 2,4,6-trisdimethylamino(methyl)phenol, 7-13%, and bis[(dimethylamino)-N-methyl]phenol, 0.1-0.5% in Part B

***As reported on the MSDS from the manufacturer, 3M, epoxy resin, 70-80%, epoxy resin, 20-30%, organosilane, 0.5-1.5% in Part A and mercaptan polymer, 60-70%, polyamine-polymercaptan blend, 30-40%, bis[(dimethylaminoethyl)ether, 1-3%, and 1,8-diazobicyclo[5.4.0]undec-7-ene, 0.5-1.5% in Part B excellent heat aging performance. The two part cyanoacrylate-epoxy hybrid formulation demonstrates improved durability relative to a cyanoacrylate, while also showing improved bonding across a variety of substrate types and improved humidity aging performance relative to the two part epoxy.

To further demonstrate the multi-substrate bonding capability of the two part cyanoacrylate epoxy hybrid embodiment of the two-part, cyanoacrylate/cationic curable adhesive system and with reference to Table 4, the various adhesive system listed were mixed and applied to the noted substrates and cured at room temperature for either 24, 48, 72 or 168 hours. As seen, four two part epoxy adhesive systems are evaluated and compared with a cyanoacrylate and a two part cyanoacrylate epoxy hybrid adhesive system. Lap shear strength measurements were observed and recorded. Table 4 illustrates the benefits of the two part cyanoacrylate epoxy hybrid adhesive With reference to Table 5, the various adhesive systems were mixed, as appropriate, and applied to grit blasted mild steel substrates and cured at room temperature for 24 hours. The cured assemblies were exposed to elevated temperature conditions (here, 150° C.) for the noted time periods to determine thermal durability and heat resistance. Heat aging measurements were observed and recorded at room temperature after aging for the noted time periods. With respect to LOCTITE 454, the data presented here is the 120° C. aging data as data at 150° C. showed no measurable bond strength. And with respect to HYSOL 3430, the data presented here is 150° C. aging after a 7 day at room temperature cure.

Table 5 illustrates that the two part cyanoacrylate epoxy hybrid embodiment of the two-part, cyanoacrylate/cationic curable adhesive system of the invention demonstrates good heat aging properties when aged at 150° C., showing performance similar to commercially available two part epoxy.

TABLE 5

| Adhesive System | | Time/Weeks | | | | | | |
|---|---|---|---|---|---|---|---|---|
| | | Initial | | | | | | |
| Type | Identity | 24 Hrs | 1 | 2 | 3 | 4 | 5 | 6 |
| CA | LOCTITE 454 | 20.68 | — | — | 4.15 | — | — | — |
| 2K Epoxy | ARALDITE FUSION | 17.28 | 29.56 | 26.35 | 27.57 | — | 22.83 | — |
| | ARALDITE 2011 | 21.78 | — | — | — | — | — | 21.17 |
| | PATTEX 5 Minute Pro Epoxy | 20.06 | 30.00 | — | 28.03 | — | — | 23.20 |
| | HYSOL 3430 | 22.27 | 28.72 | — | 34.9 | — | — | 32.62 |
| 2K CA-Epoxy Hybrid | Sample No. 3 | 20.83 | 17.46 | — | 13.78 | — | 19.64 | 21.66 |

With reference to Table 6, the various adhesive systems were mixed, as appropriate, and applied to grit blasted mild steel substrates and cured for 24 hours at room temperature. The cured assemblies were immersed in water maintained at a temperature of 60° C. for the noted time periods. Lap shear strength measurements (in Nmm$^2$) were observed and recorded.

TABLE 6

| Adhesive System | | Time/Weeks | | | | | | |
|---|---|---|---|---|---|---|---|---|
| | | Initial | | | | | | |
| Type | Identity | 24 Hrs | 1 | 2 | 3 | 4 | 5 | 6 |
| CA | LOCTITE 454 | 20.68 | — | — | — | — | — | — |
| 2K Epoxy | ARALDITE FUSION | 17.28 | 29.56 | 26.35 | 27.57 | — | 22.83 | — |
| | ARALDITE 2011 | 21.78 | 14.48 | — | 11.42 | — | 21.78 | 14.48 |
| | PATTEX 5 Minute Pro Epoxy | 20.06 | 3.02 | — | 2.64 | — | — | 2.79 |
| | HYSOL 3430 | 22.27 | — | 16.27 | — | 5.34 | — | 5.53 |
| 2K CA-Epoxy Hybrid | Sample No. 2 | 20.13 | 21.76 | — | 24.46 | — | — | 22.87 |

Table 6 demonstrates the benefit of the two part cyanoacrylate epoxy hybrid embodiment of the two-part, cyanoacrylate/cationic curable adhesive system in that it provides superior shear strength values relative to cyanoacrylates and certain two part epoxy adhesives, when assembled bonds are immersed in water and aged at a temperature of 60° C.

With reference to Table 7, the various adhesive systems were applied to grit blasted mild steel substrates and cured at room temperature for a period of 24 hours. The cured assemblies were evaluated for lap shear strength at room temperature and exposed to, and tested at, elevated temperature conditions (here, 120° C. and 150° C.) to evaluate hot strength.

TABLE 7

| Adhesive System | | Physical Property | | |
|---|---|---|---|---|
| | | Lap Shear Strength (Nmm$^2$) @ | Hot Strength (Nmm$^2$) @ | Hot Strength (Nmm$^2$) @ |
| Type | Identity | RT | 120° C. | 150° C. |
| CA | LOCTITE 454 | 20.68 | 12.1 | 0 |
| 2K CA-Epoxy Hybrid | Sample No. 2 | 22.01 | 8.5 | 5.4 |
| | Sample No. 6 | 22.5 | 10.6 | 5.0 |
| | Sample No. 7 | 18.6 | 10.5 | 5.1 |
| 2K Epoxy | DP-100 | 21.65 | 0.5 | 0.8 |
| | UNIBOND Repair 5 Min Epoxy* | 15.92 | 1.77 | 0 |
| | HYSOL 3430 | 22.27 | 1.9 | 1.8 |
| | PATTEX 5 Minute Pro Epoxy | 20.06 | 1.39 | 0 |
| | DEVCON 5 Minute Epoxy Gel** | 22.5 | 1.9 | 1.2 |
| | HYSOL E-00Cl*** | 20.8 | 0.3 | 0.4 |
| | ARALDITE 2015+ | 16.50 | 3.43 | |
| | ARALDITE 2012++ | 21.99 | 1.8 | 1.7 |

TABLE 7-continued

| Adhesive System | | Physical Property | | |
|---|---|---|---|---|
| Type | Identity | Lap Shear Strength (Nmm$^2$) @ RT | Hot Strength (Nmm$^2$) @ 120° C. | Hot Strength (Nmm$^2$) @ 150° C. |
| | HYSOL E-20HP+++ | 26.68 | 2.2 | 2.1 |
| | DP-110^ | 21.85 | 1.9 | 1.8 |

*As reported on the on the product package card, bisphenol A-epichlorohydrin epoxy resin
**As reported on the MSDS of the manufacturer, bisphenol A diglycidyl ether resin, 60-100% in Part A and a material designated as "Trade secret", 60-100% in Part B
***As reported on a MSDS, epoxy resin, 60-100% in Part A and polymercaptan hardener, 60-100%, tertiary amine, 5-10%, and aliphatic amine, 1-5% in Part B
+As reported on the MSDS from the manufacturer, 1,2-ethanediamine, N-(2-aminoethyl)-diethylenetrimaine, 3-7%, 1,2-ethanediamine, N,N'-bis(2-aminoethyl)-triethylenetetramine, 0.1-1%, 1-piperazineethanamine aminoethylpiperazine, 1-5%, phenol, 4,4'-(1-methylethylidene)bis-, polymer with (chloromethyl)oxirane, diethylenetriamine-terinated amine adduct, 1-5%, pentanoic acid, 4,4"-azobis(4-cyano-, polymer with 1,3-butadiene, 1-piperazine ethanamine and 2-propenenitrile) synthetic rubber, 10-30%, quartz, 0.1-1% oxirane, 2,2'[1,4-butanediylbis(oxymethylene)]bis-butanediol glycidyl ether, 3-7%, phenol, 4,4'-(1-methylene)bis-, polymer with (chloromethyl)oxirane bisphenol A diglycidyl ether polymer, 30-60%, 2-propenoic acid, 2-[[3-hydroxy-2,2-bis[[(1-oxo-2-propenyl)oxy]methyl]propoxy]methyl]-2-[[(1-oxo-2-propenyl)oxy]methyl]-1,3-propanediyl ester, 1-5% and phenol, 4-(1,1-dimethylethyl)-polymer with (chloromethyl)oxirane and 4,4'-(1-methylidene)bis [phenol] bisphenol A epoxy resin, 1-5%
++As reported on the MSDS from the manufacturer, butane diol diglycidyl ether, 3-7%, bisphenol A diglycidyl ether resin, 60-100%, and acrylonitrile butadiene styrene polymer, 3-7% in Part A and N'-(3-aminopropyl)-N,N-dimethyl-1,3-propane diamine, 1-5%, n-butyl acetate, 1-5%, 1-(Dimethylaminoethyl)-4-methylpiperazine, 1-5%, aliphatic mercaptan epoxy polymer, 60-100%, and 1,2-bis(2-mercaptoethoxy)ethane, 1-5% in Part B
+++As reported on a MSDS, epichlorohydrin-4,4'-isopropylidene diphenol resin, 60-100% and 2-propenoic acid, 2-methyl-, methyl ester, polymer, 10-30% in Part A
^As reported on the MSDS of the manufacturer, epoxy resin, 60-100%, methacrylate/butadiene/styrene polymer, 10-30%, hydrogenated terphenyl, 5-10%, and hydrogenated polyphenyls, <1.5% in Part A and mercaptan polymer, 60-80%, polyamide resin, 10-30%, hydrogenated terphenyl, 5-10%, epoxy resin, 1-5%, hydrogenated polyphenyls, 1-5%, 2,4,6-tris[(dimethylamino)methyl]phenol, 1-5% and carbon black, 0.1-1% in Part B Table 7 indicates that two part epoxies demonstrate poor hot strength performance. More specifically, at temperatures of 120° C. and 150° C., after curing at room temperature for 24 hours, two part epoxies showed virtually no hot strength. The two part cyanoacrylate epoxy hybrid embodiment of the two-part, cyanoacrylate/cationic curable adhesive system show excellent hot strength values when tested at 120° C., while also retaining some good hot strength performance when tested at 150° C. LOCTITE 454 also exhibits excellent hot strength performance at 120° C., but no measurable hot strength is observed at 150° C.

In the following tables, examples of the two-part cyanoacrylate epoxy hybrid embodiment of the two-part, cyanoacrylate/cationically curable adhesive system are provided, where the nature, identity and/or amounts of the constituents that form the Part A and the Part B compositions of the adhesive system are varied.

Tables 8a and 8b below show Sample Nos. 1-8, in which the identity of the elastomeric component of the Part A composition has been varied (e.g., VAMAC MR, LEVAMELT 900 and VINNOL 40/60). The Part B composition has also been varied, using different monomers/diluents/flexibilisers/core shell particles to show different performance in terms of adhesion to metals and plastics, thermal durability and humidity resistance.

TABLE 8a

Part A

| Constituents | Sample No./Amt (wt %) | | | | | | | |
|---|---|---|---|---|---|---|---|---|
| | 1 | 2 | 3 | 4 | 5 | 6 | 7 | 8 |
| Ethyl CA | 86.45 | 84.5 | 84.5 | 84.5 | 84.5 | 84.5 | 73.0 | 89 |
| VAMAC MR | 10 | — | — | — | — | — | — | — |
| LEVAMELT 900 | — | 10 | 10 | 10 | 10 | 10 | — | 10 |
| VINNOL 40/60 | — | — | — | — | — | — | 20 | — |
| BF$_3$* (ppm) | 25 | 25 | 25 | 25 | 25 | 25 | 40 | 55 |
| MSA* (ppm) | 500 | 20 | 20 | 20 | 20 | 20 | 20 | 40 |
| LiTFB | 1.0 | 1.0 | 1.0 | 1.0 | 1.0 | 1.0 | 1.0 | 1.0 |

*Added as a stock solution
†Copolymer of methyl acrylate and ethylene and acrylic acid
††Copolymer of ethylene and vinyl acetate in a 90:10 ratio

TABLE 8b

Part B

| Constituents | Sample No./Amt (wt %) | | | | | | | |
|---|---|---|---|---|---|---|---|---|
| | 1 | 2 | 3 | 4 | 5 | 6 | 7 | 8 |
| CYRACURE 6110 | 72 | 60 | 60 | 60 | 60 | 55 | 50 | 30 |
| YL-7007+ | — | — | — | — | — | — | — | 30 |
| K FLEX A 307++ | 10 | 20 | 10 | 10 | 10 | 10 | 10 | 20 |
| VAMAC MR | 10 | — | — | — | — | — | — | — |
| POLYBD 600E* | — | 20 | 20 | 20 | 20 | 15 | 30 | 20 |
| BLENDEX 360^ | — | — | 10 | — | — | 10 | — | — |
| DIANAL PB 204** | — | — | — | 10 | — | 10 | — | — |
| Diphenyl Methane | 8 | — | — | — | — | — | — | — |
| PARALOID 2314 | — | — | — | — | 10 | — | 10 | — |

+Hydrogenated bisphenol A episulfide resin from Japan Epoxy Resin
++Polyester diol flexibiliser available commercially from King Industries, CT
*Epoxidised polybutadiene available commercially from Cray Valley, Beaumont, TX
^High rubber ABS impact modifier based on polybutadiene from Chemtura Corporation, CT
**Thermoplastic acrylic resin available commercially from Dianal America, Inc., Pasadena, TX With reference to Table 9, the Part A and B compositions were mixed together in a 1:1 mix ratio to form Sample Nos. 1-7. Sample Nos. 1-7 were evaluated to determine their respective strengths when exposed to the noted cure schedules after application onto various metal and plastic substrates, such as grit blasted mild steel, aluminium, polycarbonate, ABS, PVC and PMMA. Table 9 also shows comparative adhesion data for Sample Nos. 1-8 as compared with cyanoacrylate and two part epoxy products.

TABLE 9

| Adhesive System | | Cure Schedule | Substrate Type/Tensile Shear Strength (N/mm$^2$) | | | | | |
|---|---|---|---|---|---|---|---|---|
| Type | Identity | (Hours) | GBMS | Al | PC | ABS | PVC | PMMA |
| 2K CA-Epoxy Hybrid | Sample No. 1 | 24 | 23.63 | 12.74 | 4.87 | 4.07 | 6.26 | 3.91 |
| | | 72 | 26.91 | 14.96 | 4.39 | 6.21 | 6.35 | 5.39 |
| | Sample No. 2 | 24 | 20.13 | 5.95 | 3.32 | 6.29 | 4.72 | 4.37 |
| | | 72 | 26.58 | 6.72 | 5.11 | 8.87 | SF* | 4.93 |

TABLE 9-continued

| Adhesive System | | Cure Schedule | Substrate Type/Tensile Shear Strength (N/mm$^2$) | | | | | |
|---|---|---|---|---|---|---|---|---|
| Type | Identity | (Hours) | GBMS | Al | PC | ABS | PVC | PMMA |
| | Sample No. 3 | 24 | 20.83 | 8.22 | 4.45 | 5.46 | 3.06 | 2.89 |
| | | 72 | 22.63 | 12.45 | 6.10 | SF* | SF* | 4.23 |
| | Sample No. 4 | 24 | 20.52 | 14.68 | 5.46 | 5.12 | 4.29 | 4.54 |
| | | 72 | 20.42 | 13.41 | 3.56 | 8.08 | SF* | 4.88 |
| | Sample No. 5 | 24 | 13.76 | 3.99 | 3.36 | SF* | SF* | 4.88 |
| | | 72 | 18.75 | 6.18 | 5.0 | 6.46 | SF* | 4.64 |
| | Sample No. 6 | 24 | 16.89 | 11.27 | 4.97 | 5.26 | 3.06 | 4.39 |
| | | 72 | 19.78 | 10.35 | 3.65 | 5.58 | 3.16 | 3.57 |
| | Sample No. 7 | 144 | 22.5 | 12.4 | 11.2 | 12.2 | 9.5 | 11.8 |
| | Sample No. 8 | 72 | 16.19 | 4.26 | 3.03 | — | 2.12 | — |
| 1K CA | LOCTITE 454 | 144 | 22.33 | 5.25 | 6.89 | 8.04 | 5.44 | 6.13 |
| 2K Epoxy | PATTEX 5 Minute Pro Epoxy | 72 | 20.06 | 6.23 | 2.97 | 1.66 | 2.16 | — |
| | ARALDITE FUSION | 24 | 17.28 | 10.39 | 3.69 | 1.34 | 3.35 | — |
| | DP-100 | 144 | 18.55 | 2.27 | 3.58 | 4.03 | 1.85 | 1.58 |
| | DP-105 | 144 | 15.60 | 8.64 | 0.62 | 1.46 | 2.97 | 1.41 |
| | HYSOL 3430 | 144 | 20.92 | 4.71 | 5.60 | 3.33 | 2.88 | 2.18 |
| | UNIBOND Repair 5 Min Epoxy | 144 | 21.86 | 5.21 | 4.38 | 2.09 | 1.74 | 2.09 |

*SF = substrate failure

Table 9 demonstrates the superior adhesion on a range of metal and plastic substrate types of the two part cyanoacrylate/epoxy hybrid composition embodiment of the two-part, cyanoacrylate/cationic curable adhesive system compared to two part epoxy compositions. See also FIG. 1.

With reference to Table 10 the Part A and Part B compositions of Sample Nos. 2, 3, 4 and 6 were mixed together and applied to grit blasted mild steel substrates and cured at room temperature for 24 hours. The cured assemblies were exposed to elevated temperature conditions (here, 150° C.) for the noted time periods to determine thermal durability and heat resistance. Heat aging measurements were observed and recorded and compared to the cyanoacrylate and 2K epoxy adhesives shown in Table 10.

Table 10 illustrates that the two part cyanoacrylate epoxy hybrid embodiment of the two-part, cyanoacrylate/cationic curable adhesive system demonstrates good heat aging properties when aged at 150° C. with a performance similar to commercially available two part epoxy products. Table 10 also demonstrates the poor thermal durability of cyanoacrylates, even with LOCTITE 454 being heat aged at 120° C. rather than 150° C.

TABLE 10

| Adhesive System | | Time/Weeks | | | | |
|---|---|---|---|---|---|---|
| Type | Identity | Initial | 1 week | 3 weeks | 5 weeks | 6 weeks |
| CA | LOCTITE 454 | 20.68 | 7.33 | 4.15 | — | — |
| CA-Epoxy Hybrid | Sample No. 2 | 20.13 | 13.71 | 12.42 | 11.81 | 12.57 |
| | Sample No. 3 | 20.83 | 17.46 | 13.78 | 19.64 | 21.66 |
| | Sample No. 4 | 20.52 | 15.16 | 13.38 | 11.9 | 16.06 |
| | Sample No. 6 | 16.89 | 15.43 | 23.21 | 22.63 | 18.17 |
| 2K Epoxy | ARALDITE FUSION | 17.28 | 29.56 | 26.35 | 27.57 | 22.83 |
| | PATTEX 5 Minute Pro Epoxy | 20.06 | 30 | 28.03 | 26.87 | 23.2 |
| | HYSOL 3430 | 22.27 | 28.72 | 34.9 | 33.13 | 32.62 |
| | DP-100 | 21.65 | 23.54 | 22.86 | 24.53 | 25.44 |

Figure 2:
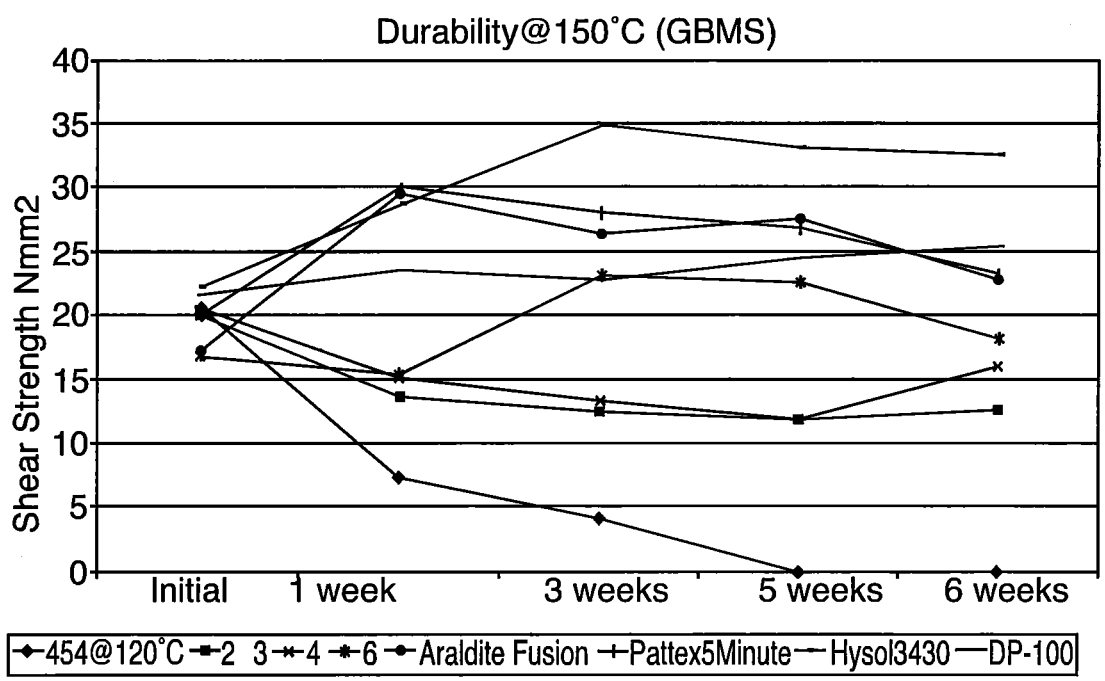
FIG. 2 depicts a plot of durability at 150° C. over time of various commercially available products and two part cyanoacrylate/epoxy hybrid adhesive systems.

The data presented in Table 10 is graphically illustrated in FIG. 2.

With reference to Table 11, the Part A and Part B compositions of Sample Nos. 2, 3 and 4 were mixed together and applied to grit blasted mild steel substrates and cured at room temperature for 24 hours. The cured assemblies were exposed to heat and humidity aging conditions (here, 65° C./95% RH) for the noted time periods to determine heat and humidity resistance. Heat and humid aging performance was observed and recorded, and compared to the two part epoxy products as shown in Table 11.

Figure 3:
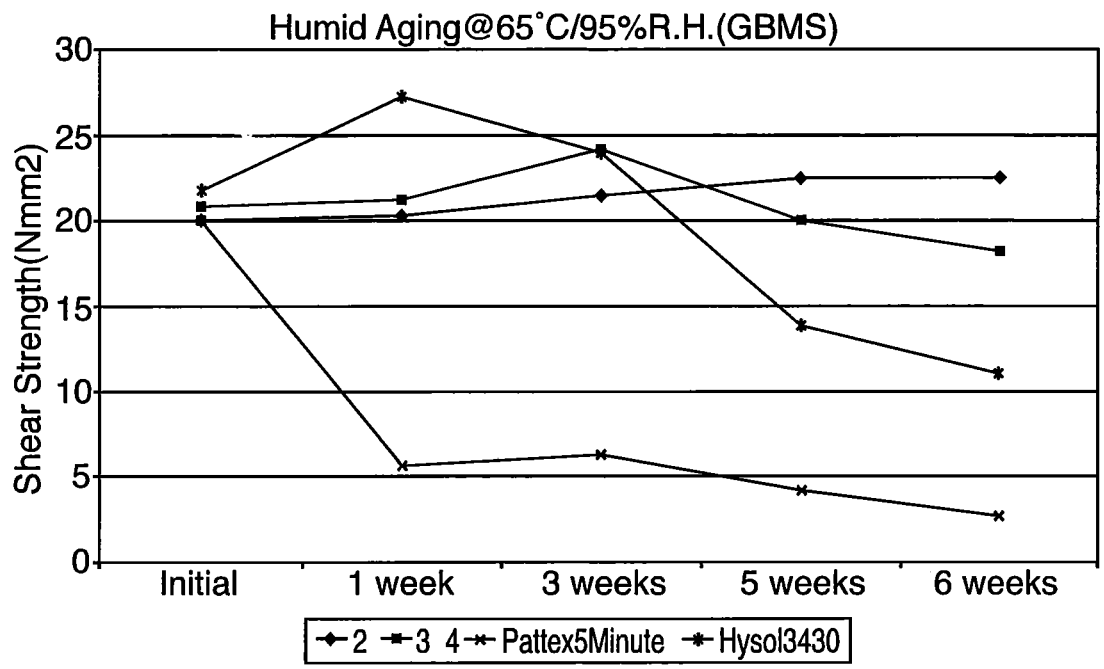
FIG. 3 depicts a plot of humidity aging over time of various commercially available two part epoxy products and two part cyanoacrylate/epoxy hybrid adhesive systems.

The data presented in Table 11 and graphically in FIG. 3 demonstrates the improved humidity resistance of the inventive compositions compared to two part epoxy adhesive systems. No data is presented for a cyanoacrylate adhesive system because of the low bond strengths attained.

TABLE 11

| Adhesive System | | Tensile Shear Strength (Nmm$^2$) After Aging @ 65° C./95% RH | | | | |
|---|---|---|---|---|---|---|
| Type | Identity | Initial | 1 week | 3 weeks | 5 weeks | 6 weeks |
| 2K CA-Epoxy Hybrid | Sample No. 2 | 20.13 | 20.35 | 21.49 | 22.48 | 22.49 |
| | Sample No. 3 | 20.83 | 21.21 | 24.21 | 19.93 | 18.04 |
| | Sample No. 4 | 20.52 | 19.48 | 23.04 | 24.4 | 18.4 |
| 2K Epoxy | PATTEX 5 Minute Pro Epoxy | 20.06 | 5.65 | 6.25 | 4.11 | 2.56 |
| | HYSOL 3430 | 21.96 | 27.38 | 23.92 | 13.84 | 11.04 |

With reference to Table 12, the Part A and Part B composition of Sample No. 2 was applied to GBMS and cured at room temperature for 24 hours. The cured assemblies were immersed in water heated to a temperature of 60° C. for the noted time periods to determine moisture resistance. Moisture resistance measurements were observed and recorded, and compared to the two part epoxy products as shown in Table 12.

TABLE 12

| Adhesive System Type | Adhesive System Type | Initial | 1 week | 3 weeks | 5 weeks | 6 weeks |
|---|---|---|---|---|---|---|
| 2K CA-Epoxy Hybrid | Sample No. 2 | 20.13 | 21.76 | 24.46 | 23.67 | 22.87 |
| 2K Epoxy | ARALDITE FUSION | 17.28 | 29.56 | 27.57 | 22.83 | 21.3 |
| | PATTEX 5 Minute Pro Epoxy | 20.06 | 3.02 | 2.64 | 2.02 | 2.79 |
| | HYSOL 3430 | 22.27 | 16.27 | 5.34 | 5.53 | 6.63 |

Figure 4:
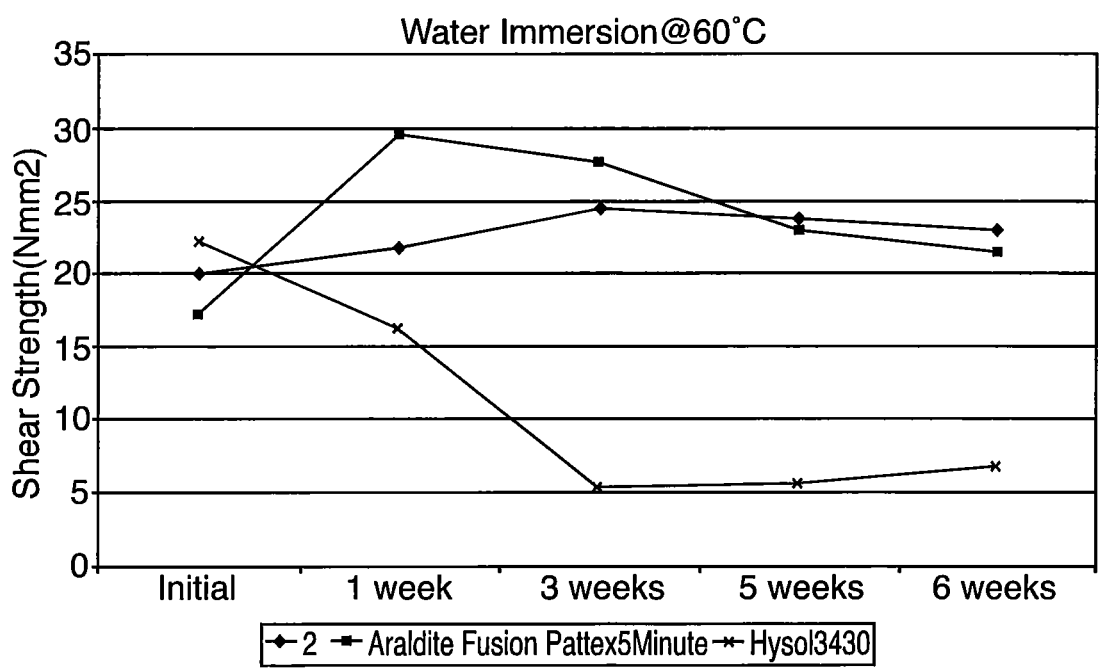
FIG. 4 depicts a plot of moisture resistance over time of various commercially available two part epoxy products and two part cyanoacrylate/epoxy hybrid adhesive systems.

The data in Table 12 is shown graphically in FIG. 4. This data illustrates the beneficial moisture resistance performance shown by the two part cyanoacrylate/epoxy hybrid adhesive system embodiment.

Tables 13a and 13b below show Sample Nos. 9-12, in which the identity of the elastomeric component of the Part A composition has been varied (e.g., VAMAC MR and VINNOL 40/60). The Part B composition has also been varied, using one flexibiliser (albeit at two different weight percentages) together with three different fillers to show different performance.

TABLE 13a

Part A

| Constituents | 9 | 10 | 11 | 12 |
|---|---|---|---|---|
| ECA | 77.75 | 73 | 73 | 73 |
| VAMAC MR | 20.0 | — | — | — |
| VINNOL 40/60 | — | 20 | 20 | 20 |
| $BF_3$* (ppm) | 20 | 20 | 20 | 20 |
| MSA* (ppm) | 2,500 | 40 | 40 | 40 |
| LiTFB | 2.0 | 1 | 1 | 1 |

TABLE 13b

Part B

| Constituents | 9 | 10 | 11 | 12 |
|---|---|---|---|---|
| NANOPOX A610 | 80 | 60 | — | — |
| ALBIDUR EP5340 | — | — | 60 | — |
| ALBIFLEX XP544 | — | — | — | 60 |
| K FLEX A307 | 20 | 40 | 40 | 40 |

With reference to Table 14 below after the Part A and B compositions were mixed together in a 1:1 mix ratio, Sample Nos. 9-12 were evaluated to determine their respective tensile shear strengths on various metal and plastic substrates, such as grit blasted mild steel, aluminium, polyvinyl chloride, polycarbonate, PMMA and ABS.

TABLE 14

| | Sample No./Tensile Shear Strength (N/mm²) | | | |
|---|---|---|---|---|
| Substrate Type | 9 | 10 | 11 | 12 |
| GBMS | 14.3 | 7.65 | Polymerised too quickly | 4.72 |
| Al | 10.80 | 8.05 | | 3.72 |
| PVC | — | 1.61 | | 1.3 |
| PC | — | 2.09 | | 0 |
| PMMA | — | 3.19 | | 0 |
| ABS | — | 5.08 | | 0.5 |

In the following tables, examples of the two-part cyanoacrylate/epoxy hybrid embodiment of the two-part, cyanoacrylate/cationically curable adhesive system are provided, where the nature, identity and/or amounts of the constituents that form the Part A and the Part B compositions of the adhesive system are varied.

Figure 5:
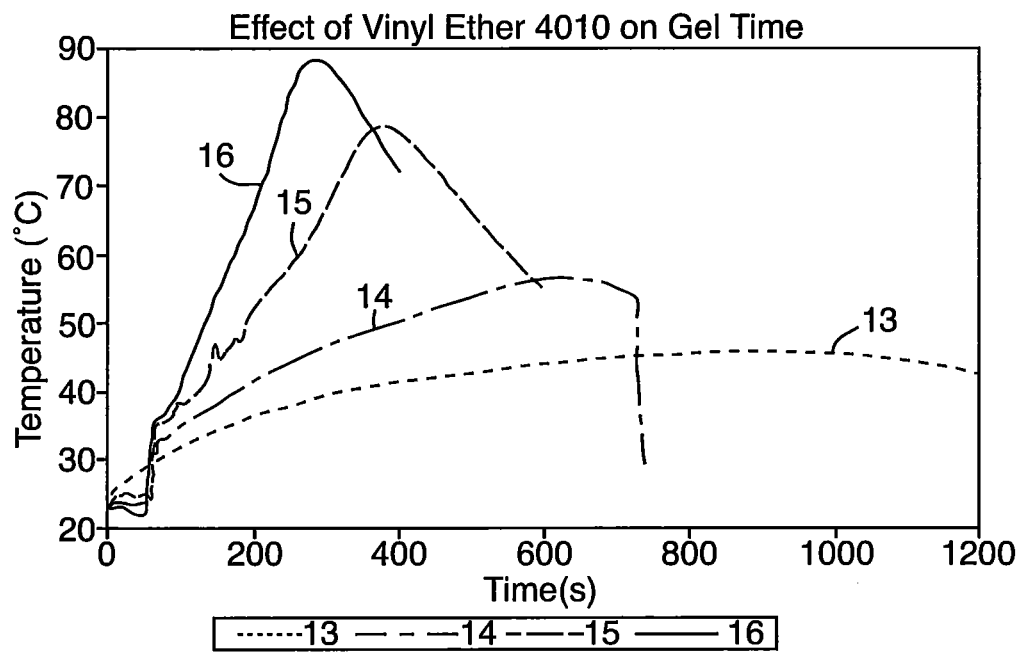
FIG. 5 depicts a plot of temperature over time of measuring the impact of vinyl ethers on gel time (for Sample Nos. 13-16).
Figure 6:
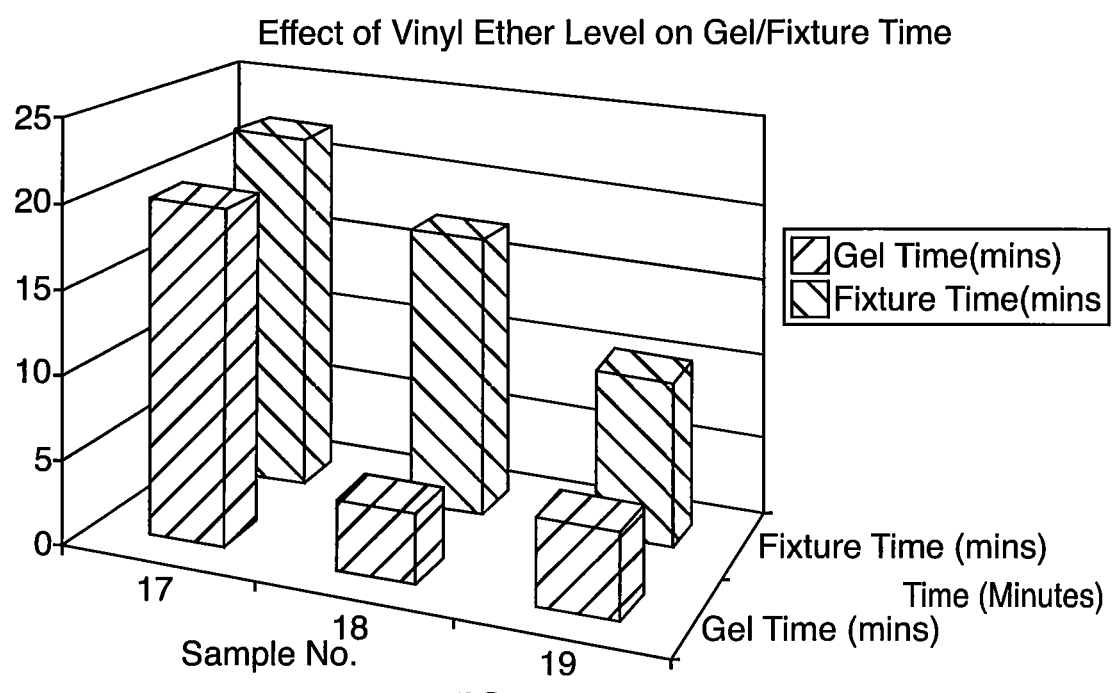
FIG. 6 depicts a three dimensional plot of temperature over time of measuring the impact of vinyl ethers on fixture time and gel time (for Sample Nos. 17-19), capturing the data shown in Table 17.

Table 15a and 15b below show Sample Nos. 13-16, in which the Part A composition has been held constant and the Part B composition has been varied to show no vinyl ether component, 1% vinyl ether component, 3% vinyl ether component, and 5% vinyl ether component, respectively. The addition of the vinyl ether component improves fixture time over the control sample without any vinyl ether component; at a concentration of 5% by weight reduces fixture time by 50% (from 50 minutes to 25 minutes). (See FIG. 5.)

TABLE 15a

Part A

| Constituents | 13 | 14 | 15 | 16 |
|---|---|---|---|---|
| ECA | 75.28 | 75.28 | 75.28 | 75.28 |
| VINNOL 40/60 | 20.00 | 20.00 | 20.00 | 20.00 |
| $BF_3$ (ppm) | 35 | 35 | 35 | 35 |
| MSA (ppm) | 40 | 40 | 40 | 40 |
| Phosphoric Acid | 0.075 | 0.075 | 0.075 | 0.075 |
| LiTFB | 0.98 | 0.98 | 0.98 | 0.98 |

TABLE 15b

Part B

| Constituents | 13 | 14 | 15 | 16 |
|---|---|---|---|---|
| Cycloaliphatic epoxy | 50.00 | 50.00 | 50.00 | 50.00 |
| PARALOID 2314 | 10.00 | 10.00 | 10.00 | 10.00 |
| K Flex A307 | 40.00 | 40.00 | 40.00 | 40.00 |
| VEctomer 4010 | — | 1.00 | 3.00 | 5.00 |

Referring to Tables 16a and 16b, samples were prepared using in the Part B composition VECTOMER 5015 or VECTOMER 4010.

TABLE 16a

Part A

| Constituents | 17 | 18 | 19 |
|---|---|---|---|
| ECA | 88.50 | 88.50 | 88.50 |
| LEVAMELT 900 | 10.00 | 10.00 | 10.00 |
| $BF_3$ (ppm) | 55 | 55 | 55 |
| MSA (ppm) | 40 | 40 | 40 |

TABLE 16a-continued

| | Part A | | |
|---|---|---|---|
| | Sample Nos./Amt (wt %) | | |
| Constituents | 17 | 18 | 19 |
| Phosphoric Acid | 450 | 450 | 450 |
| LiTFB | 1.0 | 1.0 | 1.0 |

TABLE 16b

| | Part B | | |
|---|---|---|---|
| | Sample Nos./Amt (wt %) | | |
| Constituents | 17 | 18 | 19 |
| Cycloaliphatic Epoxy | 47.60 | 47.60 | 47.60 |
| K Flex A307 | 24.00 | 24.00 | 24.00 |
| BLENDEX 362 | 8.40 | 8.40 | 8.40 |
| 1,4-Butanediol DGE | 20.00 | 20.00 | 20.00 |
| VEctomer 4010 | — | 4.00 | — |
| VEctomer 5015 | — | — | 4.00 |

Referring to Table 17, it may be seen that comparable results—in terms of gel times and fixture times—were observed for two part compositions prepared with each of the two vinyl ethers.

TABLE 17

| Physical | Sample No. | | |
|---|---|---|---|
| Properties | 17 | 18 | 19 |
| Gel Time (mins) | 20 | 4 | 5 |
| Fixture Time (mins) | 22 | 17 | 10 |

Figure 7:
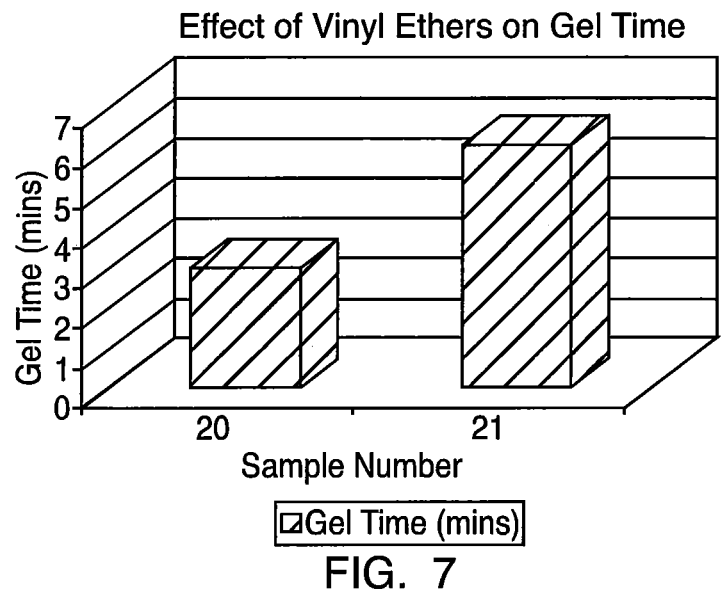
FIG. 7 depicts a plot measuring the impact of vinyl ethers on gel time (for Sample Nos. 20 and 21).

Referring to Tables 18a and 18b, samples (Nos. 20 and 21) were prepared using in the Part B composition 1,4-dicyclohaxanedimethanol divinyl ether or VECTOMER 4010 to show their respective effects on gel times. For a graphic representation of the respective gel times, see FIG. 7.

TABLE 18a

| | Part A | |
|---|---|---|
| | Sample Nos./Amt (wt %) | |
| Constituents | 20 | 21 |
| ECA | 83.04 | 83.04 |
| VINNOL 40/60 | 15 | 15 |
| $BF_3$ (ppm) | 15 | 15 |
| Phosphoric Acid (ppm) | 450 | 450 |
| LiTFB | 1.0 | 1.0 |

TABLE 18b

| | Part B | |
|---|---|---|
| | Sample Nos./Amt (wt %) | |
| Constituents | 20 | 21 |
| Cycloaliphatic Epoxy | 58.3 | 58.3 |
| K Flex A307 | 29.2 | 29.2 |
| PARALOID 2314 | 10 | 10 |
| 1,4-Cyclohexanedimethanol Divinyl Ether | 2.5 | — |
| VEctomer 4010 | — | 2.5 |

Figure 8:
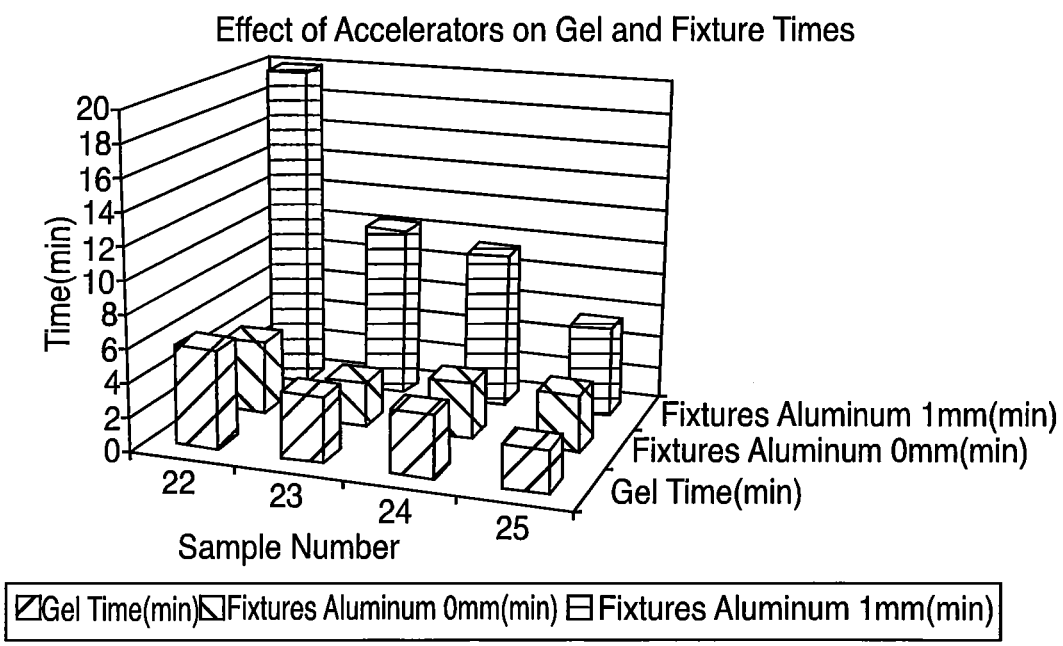
FIG. 8 depicts a three dimensional plot measuring the impact of vinyl ethers on gel and fixture times (for Sample Nos. 22-25).

Referring to Tables 19a and 19b, samples (Nos. 22-25) were prepared using in the Part B composition 1,4-dicyclohaxanedimethanol divinyl ether, limonene diepoxide or α-pinene oxide to show their respective effects on gel and fixture times. For a graphic representation of the respective gel times, see FIG. 8.

TABLE 19a

| | Part A | | | |
|---|---|---|---|---|
| | Sample Nos./Amt (wt %) | | | |
| Constituents | 22 | 23 | 24 | 25 |
| ECA | 83.05 | 83.05 | 83.05 | 83.05 |
| VINNOL 40/60 | 15 | 15 | 15 | 15 |
| $BF_3$ (ppm) | 25 | 25 | 25 | 25 |
| Phosphoric Acid | 0.02 | 0.02 | 0.02 | 0.02 |
| LiTFB | 0.98 | 0.98 | 0.98 | 0.98 |

TABLE 19b

| | Part B | | | |
|---|---|---|---|---|
| | Sample Nos./Amt (wt %) | | | |
| Constituents | 22 | 23 | 24 | 25 |
| Cycloaliphatic Epoxy | 60.00 | 58.3 | 58.3 | 58.3 |
| PARALOID 2314 | 10.00 | 10.00 | 10.00 | 10.00 |
| K Flex A307 | 30.0 | 29.2 | 29.2 | 29.2 |
| 1,4 Cyclohexanedimethanol Divinyl Ether | — | 2.5 | — | — |
| Limonene Diepoxide | — | — | 2.5 | — |
| α-Pinene Oxide | — | — | - | 2.5 |

What is claimed is:

1. A two part curable composition comprising:
   (a) a first part comprising a cyanoacrylate component and a cationic catalyst; and
   (b) a second part comprising a cationic curable component, and a vinyl ether component,
   wherein when mixed together the cationic catalyst initiates cure of the cationic curable component.

2. The composition of claim 1, wherein the cyanoacrylate component comprises $H_2C=C(CN)-COOR$, wherein R is selected from alkyl, alkoxyalkyl, cycloalkyl, alkenyl, aralkyl, aryl, allyl and haloalkyl groups.

3. The composition of claim 1, wherein the cationic catalyst comprises salts of lithium and metals from Group II of the Periodic Table, and non-nucleophilic acids.

4. The composition of claim 1, wherein the cationic catalyst is a non-nucleophilic acid having a pH of less than 1.0 when measured as a 10% by weight solution in water.

5. The composition of claim 1, wherein the cationic catalyst is a member selected from the group consisting of fluoroboric, fluoroarsenic, fluoroantimonic and fluorophosphoric acids; lithium tetrafluoroborate, calcium di-tetrafluoroborate, magnesium di-tetrafluoroborate, lithium hexafluorophosphate, calcium di-hexafluorophosphate, magnesium di-hexafluorophosphate, lithium hexafluoroantimonate and lithium hexafluoroarsenate; lanthanide triflate salts, aryl iodonium salts, aryl sulfonium salts, lanthanum triflate, ytterbium triflate, trimethoxyboroxine, trimethoxyboroxine-aluminum acetyl acetonate, amine-boron trihalide complexes, quaternary ammonium salts, quaternary phosphonium salts, tri-aryl sulfonium salts, di-aryl iodonium salts, and diazonium salts; trialkoxyboroxine curing agents; and combinations thereof.

6. The composition of claim 1, wherein the cationic curable component is selected from an epoxy component, an oxetane component, an episulfide component, and combinations thereof.

7. The composition of claim 1, wherein the cationic curable component is an epoxy component selected from the group consisting of cycloaliphatic epoxy, aromatic epoxy, aliphatic epoxy and hydrogenated aromatic epoxy.

8. The composition of claim 6, wherein the epoxy component comprises a member selected from the group consisting of epoxy-functionalized hydrogenated bisphenol-A, bisphenol-F, bisphenol-E, bisphenol-S and biphenyl.

9. The composition of claim 1, wherein the first part is housed in a first chamber of a dual chamber syringe and the second part is housed in a second chamber of the dual chamber syringe.

10. The composition of claim 1, wherein the second part further comprises at least one of a plasticizer, a filler and a toughener.

11. The composition of claim 10, wherein the toughener is a member selected from the group consisting of (1) reaction products of the combination of ethylene, methyl acrylate and monomers having carboxylic acid cure sites, (2) dipolymers of ethylene and methyl acrylate, (3) vinylidene chloride-acrylonitrile copolymers, (4) and vinyl chloride/vinyl acetate copolymer, (5) copolymers of polyethylene and polyvinyl acetate, and combinations thereof.

12. The composition of claim 1, wherein the first part and the second part are present in a ratio of about 1:1 by volume.

13. The composition of claim 1, wherein the first part and the second part are each housed in a separate chamber of a dual chambered container.

14. The composition of claim 1, wherein the vinyl ether component is a member selected from the group consisting of bis[4-(vinyloxy)butyl] isophthalate, 1,4-cyclohexanedimethanol divinyl ether,

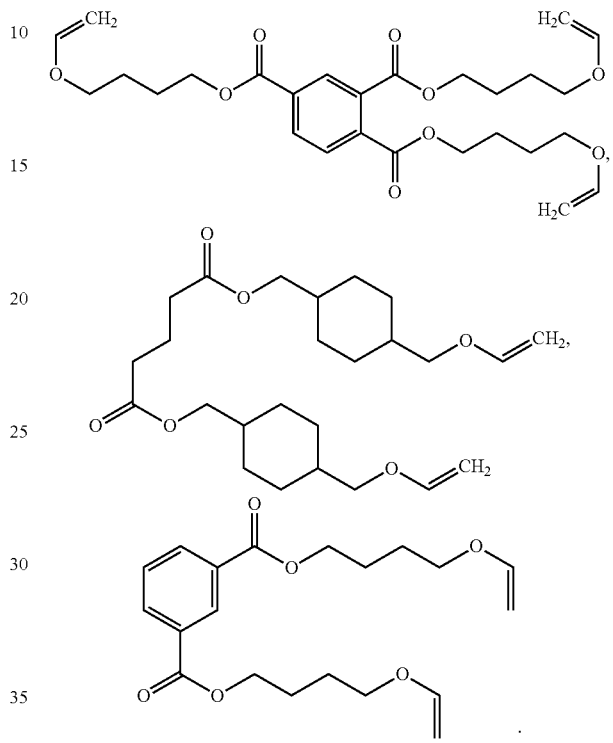

15. The composition of claim 1, further comprising phosphoric acid.

* * * * *